United States Patent
Nakagawa

(10) Patent No.: US 10,884,463 B2
(45) Date of Patent: Jan. 5, 2021

(54) METHOD FOR MANUFACTURING DISPLAY DEVICE AND DISPLAY DEVICE

(71) Applicant: Sharp Kabushiki Kaisha, Sakai (JP)

(72) Inventor: Kiyoshi Nakagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 113 days.

(21) Appl. No.: 16/464,331

(22) PCT Filed: Sep. 29, 2017

(86) PCT No.: PCT/JP2017/035704
§ 371 (c)(1),
(2) Date: May 28, 2019

(87) PCT Pub. No.: WO2019/064572
PCT Pub. Date: Apr. 4, 2019

(65) Prior Publication Data
US 2020/0387201 A1 Dec. 10, 2020

(51) Int. Cl.
- *G09F 9/30* (2006.01)
- *G06F 1/18* (2006.01)
- *G09F 9/302* (2006.01)
- *G06F 1/16* (2006.01)

(52) U.S. Cl.
CPC ............ *G06F 1/189* (2013.01); *G06F 1/1652* (2013.01); *G06F 1/181* (2013.01); *G09F 9/301* (2013.01); *G09F 9/3026* (2013.01)

(58) Field of Classification Search
CPC ........ G06F 1/189; G06F 1/1652; G06F 1/181; G09F 9/301; G09F 9/3026; G02F 1/13336; G02F 1/1345; G02F 1/13452
See application file for complete search history.

(56) References Cited

U.S. PATENT DOCUMENTS

| | | | |
|---|---|---|---|
| 2005/0078104 A1* | 4/2005 | Matthies | H01L 27/156 345/204 |
| 2005/0285811 A1 | 12/2005 | Kawase et al. | |
| 2008/0074344 A1 | 3/2008 | Lee et al. | |

(Continued)

FOREIGN PATENT DOCUMENTS

| | | |
|---|---|---|
| JP | 10-111517 A | 4/1998 |
| JP | 2006-010811 A | 1/2006 |

(Continued)

OTHER PUBLICATIONS

Official Communication issued in International Patent Application No. PCT/JP2017/035704, dated Dec. 12, 2017.

*Primary Examiner* — James Wu
*Assistant Examiner* — Hung Q Dang
(74) *Attorney, Agent, or Firm* — Keating & Bennett, LLP

(57) ABSTRACT

A frame region of one of the display units (i) includes a terminal portion provided with terminals whose terminal surfaces are flush with a display surface, and (ii) is bent to allow the terminal surface of the terminal portion to be oriented to the opposite side of the display surface. A frame region of the other one of the display units includes a terminal portion provided with a terminals whose terminal surfaces are flush with a display surface. The terminal portions of the two display units are bonded to each other to allow the two terminals to be electrically connected to each other.

20 Claims, 18 Drawing Sheets

(56) References Cited

U.S. PATENT DOCUMENTS

| | | |
|---|---|---|
| 2008/0074345 A1 | 3/2008 | Lee et al. |
| 2009/0225396 A1* | 9/2009 | Sampsell ............. G02B 26/001 359/292 |
| 2010/0065832 A1 | 3/2010 | Sugimoto |
| 2010/0177018 A1 | 7/2010 | Wang et al. |
| 2012/0268445 A1 | 10/2012 | Ogata et al. |
| 2015/0228704 A1 | 8/2015 | Miyake et al. |
| 2015/0233557 A1 | 8/2015 | Aoyama et al. |
| 2016/0014882 A1* | 1/2016 | Jongman ................ H05K 1/028 361/749 |
| 2016/0210103 A1 | 7/2016 | Yoshizumi et al. |
| 2020/0058730 A1* | 2/2020 | Ha ...................... H01L 27/3293 |

FOREIGN PATENT DOCUMENTS

| | | |
|---|---|---|
| JP | 2008-083701 A | 4/2008 |
| JP | 2009-282432 A | 12/2009 |
| JP | 2010-160489 A | 7/2010 |
| JP | 2014-103023 A | 6/2014 |
| JP | 2014-132319 A | 7/2014 |
| JP | 2015-166862 A | 9/2015 |
| JP | 2015-180924 A | 10/2015 |
| JP | 2016-167049 A | 9/2016 |
| WO | 2008/123416 A1 | 10/2008 |
| WO | 2011/068158 A1 | 6/2011 |

* cited by examiner

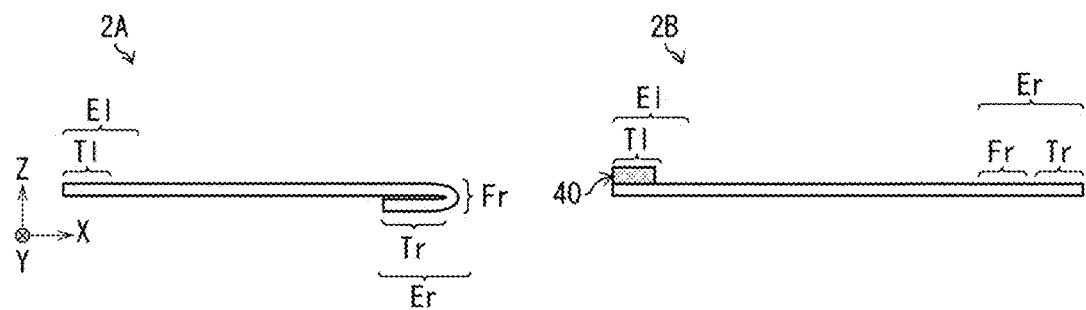
FIG. 6
FIG. 7A
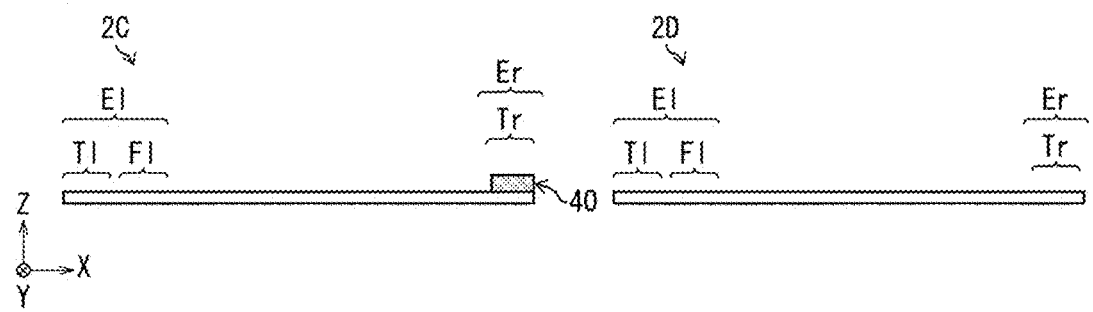
FIG. 7B
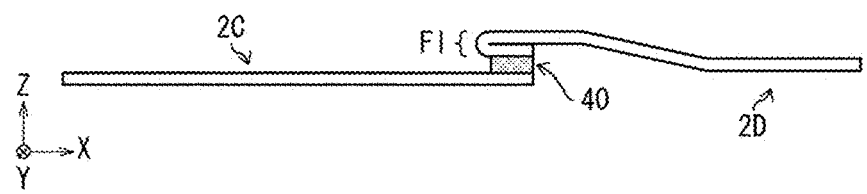

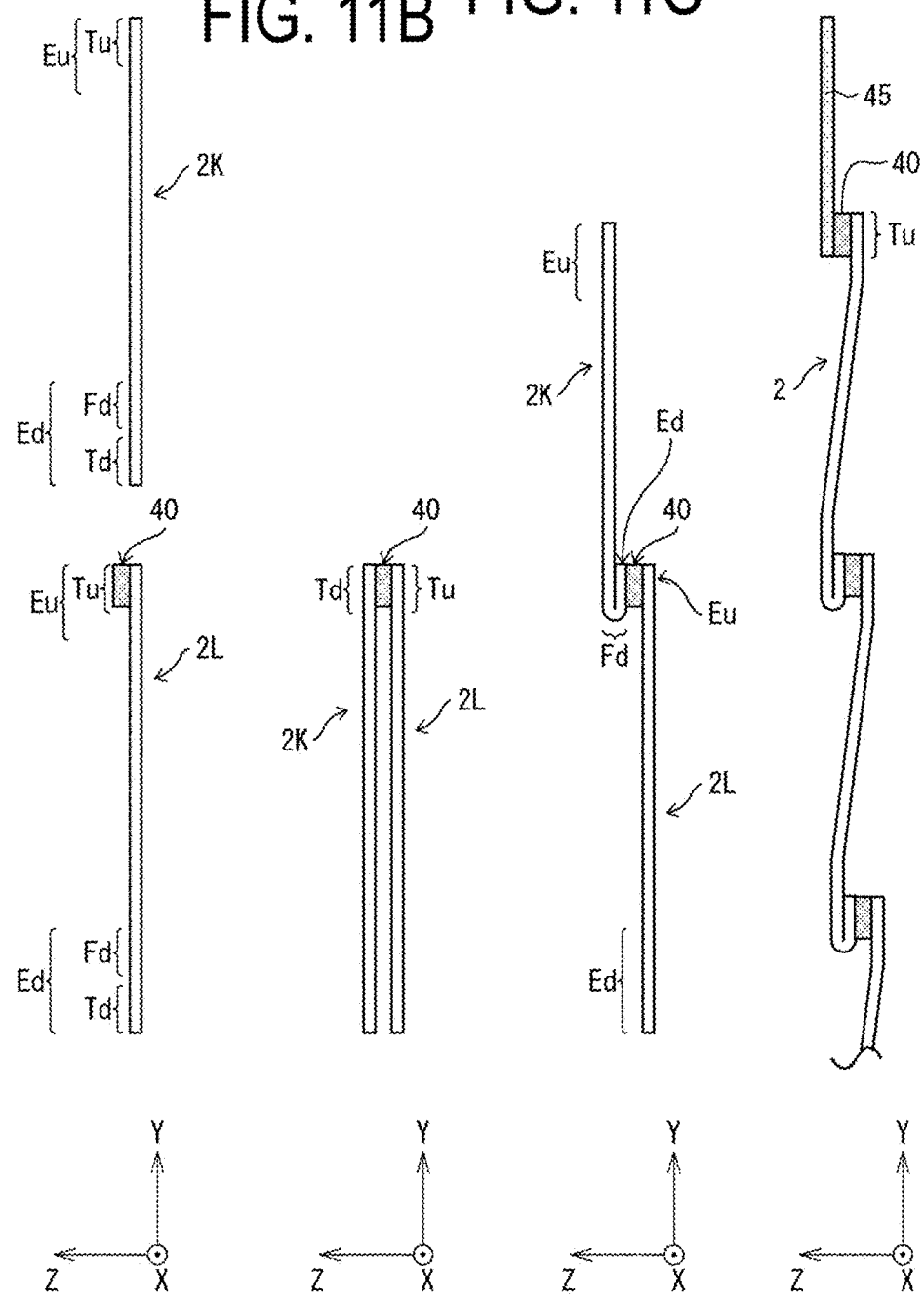

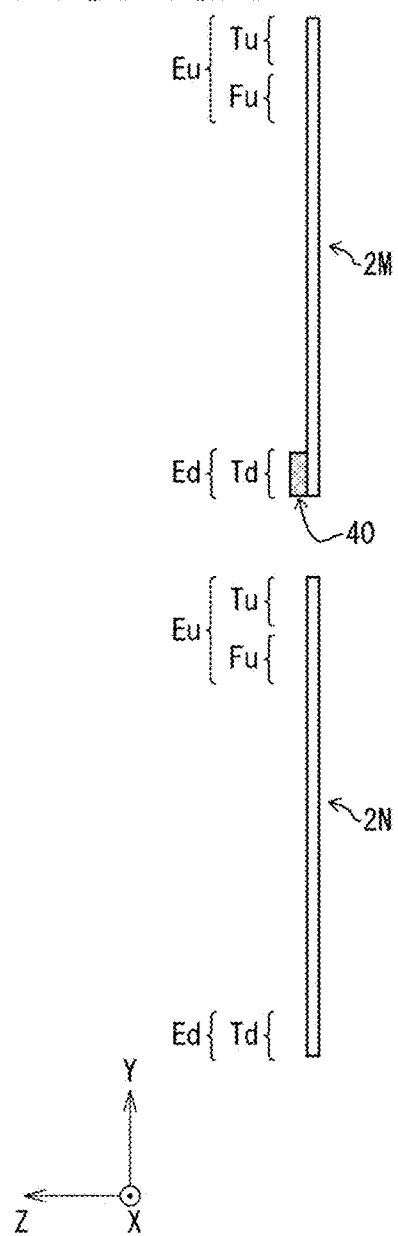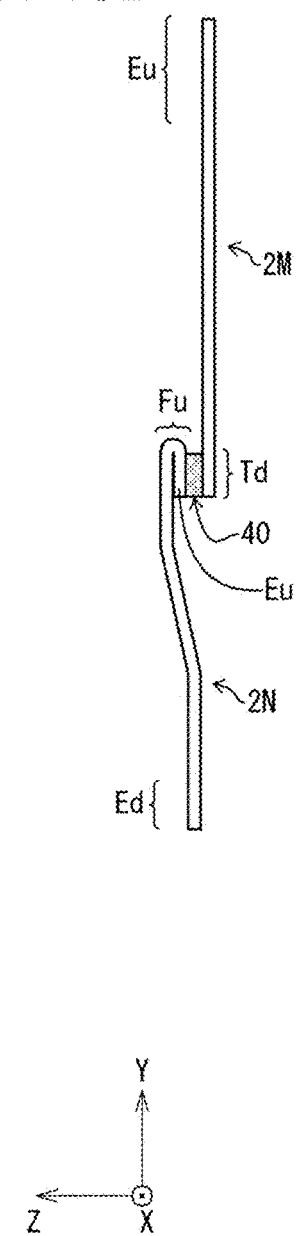

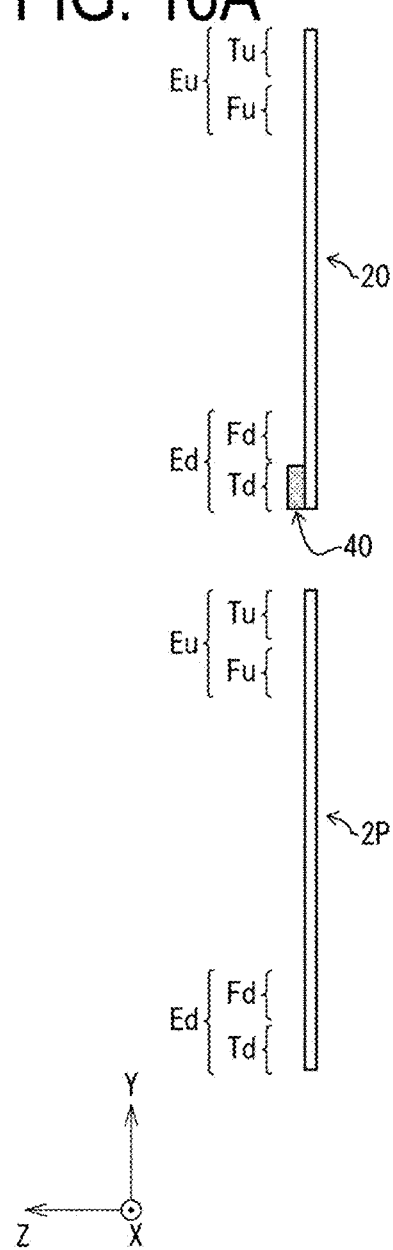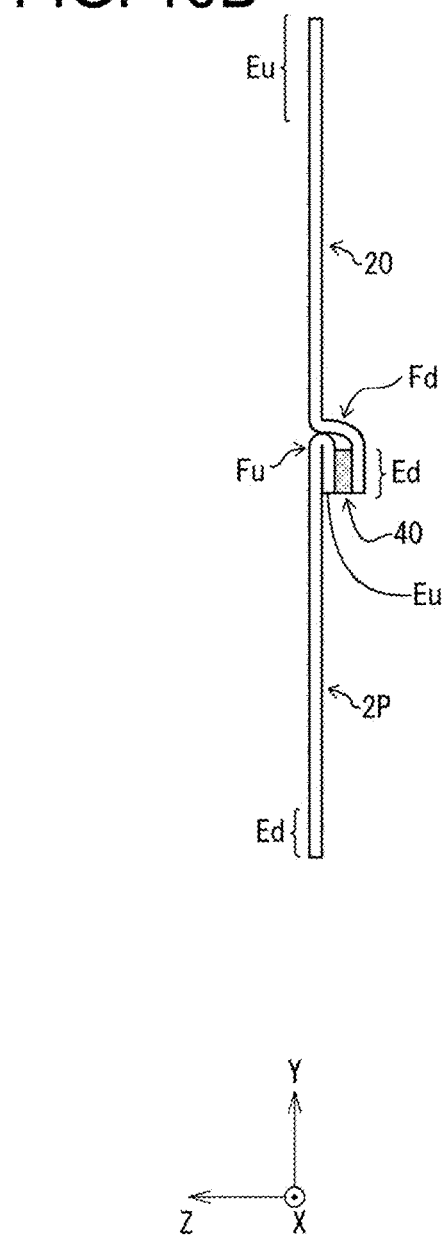

METHOD FOR MANUFACTURING DISPLAY DEVICE AND DISPLAY DEVICE

TECHNICAL FIELD

The disclosure relates to a method for manufacturing a display device and also to a display device.

BACKGROUND ART

Various kinds of flat panel display devices have been developed in recent years. Among them, much attention has been attracted particularly to EL display devices including: organic Electro Luminescence (EL) display devices equipped with Organic Light Emitting Diodes (OLEDs); and inorganic EL display devices equipped with inorganic light emitting diodes. This is because such EL display devices achieve higher picture qualities and save power consumption.

In a case where, however, a display device is manufactured by a method including a step where a high-definition vapor deposition film is formed in a vacuum by use of a vapor deposition mask, it is difficult to form a uniform, high-definition vapor deposition film on a large mother substrate, which makes it difficult to get large-sized display devices and manufacture such display devices at a low cost.

PTL 1 discloses an electronic device having an increased display size by coupling a plurality of display modules by use of a plurality of Flexible Printed Circuit Boards (FPCBs).

PTL 2 discloses a configuration where red-color display panel, green-color display panel, and a blue-color display panel are connected commonly to a single flexible circuit board. PTL 2 claims that such a configuration can reduce the number of flexible circuit boards to be used.

PTL 3 discloses a cylindrical display device formed by curling a flexible display panel.

PTL 4 discloses a connection structure of organic EL panels emitting light of different colors, and claims that the use of the connection structure helps prevent miswiring.

CITATION LIST

Patent Literature

PTL 1: JP 2010-160489 A (published Jul. 22, 2010)
PTL 2: JP 2009-282432 A (published on Dec. 3, 2009)
PTL 3: JP 2016-167049 A (published on Sep. 15, 2016)
PTL 4: JP 2014-103023 A (published Jun. 5, 2014)

SUMMARY

Technical Problem

As described above, some display devices achieve increased display sizes by coupling a plurality of display units. If such display devices need to have higher picture qualities, it is desirable for each of such display devices to have smaller gaps (i.e., breaks of displayed images) between every two adjacent display units included therein.

Solution to Problem

To solve the above described problem, a display device according to an aspect of the disclosure provides a display device. The display device includes a plurality of display bodies coupled to one another, each of the display bodies including a display region having a display surface oriented in a first direction. In the display device, each of the display bodies includes the display region and a frame region surrounding the display region, and the display bodies include a first display body and a second display body. In addition, (i) the frame region of the first display body includes a first terminal portion including a plurality of first terminals formed therein, each of the first terminals having a terminal surface flush with the display surface, and (ii) in the frame region of the first display body, the terminal surface of the first terminal portion is bent towards a second direction, which is opposite the first direction. Moreover, the frame region of the second display body includes a second terminal portion including a plurality of second terminals formed therein, each of the second terminals having a terminal surface flush with the display surface. Furthermore, the first terminal portion of the first display body is bonded to the second terminal portion of the second display body to allow each of the first terminals to be electrically connected to the corresponding one of second terminals.

To solve the above described problem, a method for manufacturing a display device according to an aspect of the disclosure provides a method for manufacturing a display device. The method includes coupling a plurality of display bodies to each other to allow a display surface of a display region to be oriented towards a first direction. Each of the display bodies includes the display region and a frame region surrounding the display region. Each of the display bodies includes a first display body and a second display body. The frame region of the first display body includes a first terminal portion where a plurality of first terminals have their respective terminal surfaces flush with the display surface. The frame region of the second display body includes a second terminal portion where a plurality of second terminals have their respective terminal surfaces flush with the display surface. In this method, the coupling includes a first bending step for bending a frame region of the first display body to allow a terminal surface of the first terminal portion to be oriented towards a second direction, the opposite direction to the first direction, and a first bonding step for bonding the first terminal portion of the first display body to the second terminal portion of the second display body to allow each of the first terminals to be electrically connected to the corresponding one of the second terminals.

Advantage Effects of Disclosure

The disclosure has an effect of reducing the gap (i.e., breaks of displayed images) between every two adjacent flexible display bodies.

BRIEF DESCRIPTION OF DRAWINGS

FIG. 6 is a cross-sectional view illustrating an exemplar one of various modified examples of the coupling step illustrated in FIGS. 4A to 4E.

FIGS. 7A and 7B are cross-sectional views illustrating a different exemplar one of various modified examples of the coupling step illustrated in FIGS. 4A to 4E.

FIGS. 11A to 11D are cross-sectional views illustrating a coupling step illustrated in FIG. 10B.

FIGS. 15A and 15B are cross-sectional views illustrating different exemplar ones of various modified examples of the coupling step illustrated in FIGS. 11A to 11D.

FIGS. 16A and 16B are cross-sectional views illustrating still different exemplar ones of various modified examples of the coupling step illustrated in FIGS. 11A to 11D.

DESCRIPTION OF EMBODIMENTS

Figure 1:
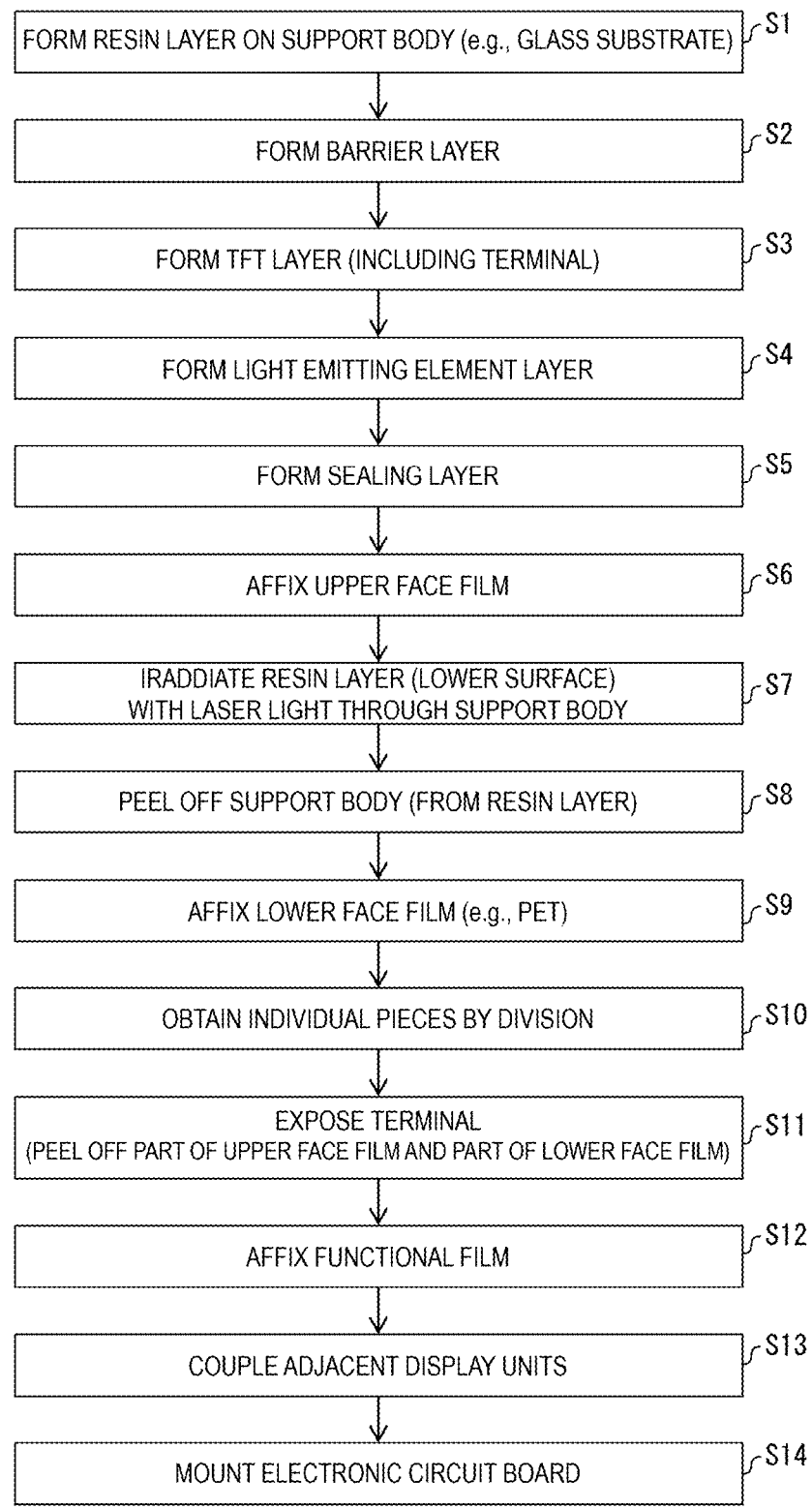
FIG. 1 is a flowchart illustrating an exemplar method for manufacturing a display device according to some embodiments of the disclosure.

A description follows regarding embodiments of the disclosure, with reference to FIGS. 1 to 14. Hereinafter, for convenience of descriptions, a configuration having the same functions as those of a configuration described in a specific embodiment are denoted by the same or similar reference numerals, and its descriptions may be omitted.

The description of the following embodiments is based on a case where a Flexible Printed Circuit Board (FPCB) is used as a circuit board. The embodiments, however, are not limited to such a case. A non-flexible circuit board may be used, instead.

In addition, the description of the following embodiments is based on a case where a flexible organic Electro luminescence (EL) panel is used as a display body. The embodiments, however, are not limited to such a case. a different flexible display panel from the organic EL display panel may be used, instead.

First Embodiment

Figure 2A:
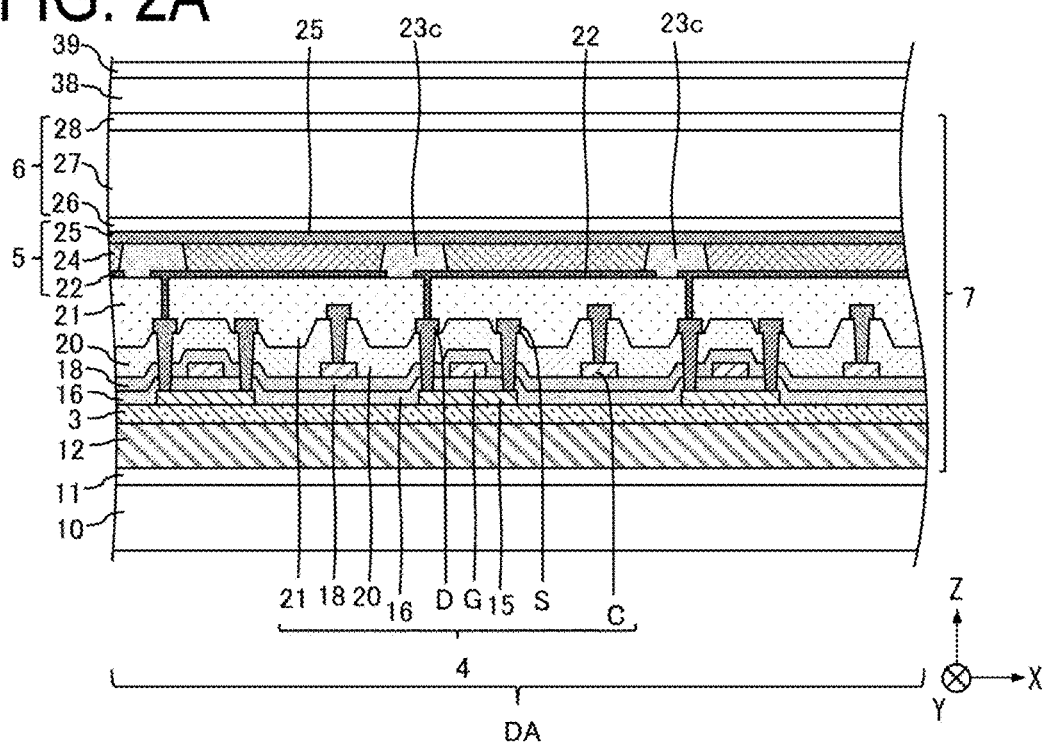
FIG. 2A is a cross-sectional view illustrating an exemplar configuration of the display device (active region) according to some embodiments of the disclosure.
Figure 2B:
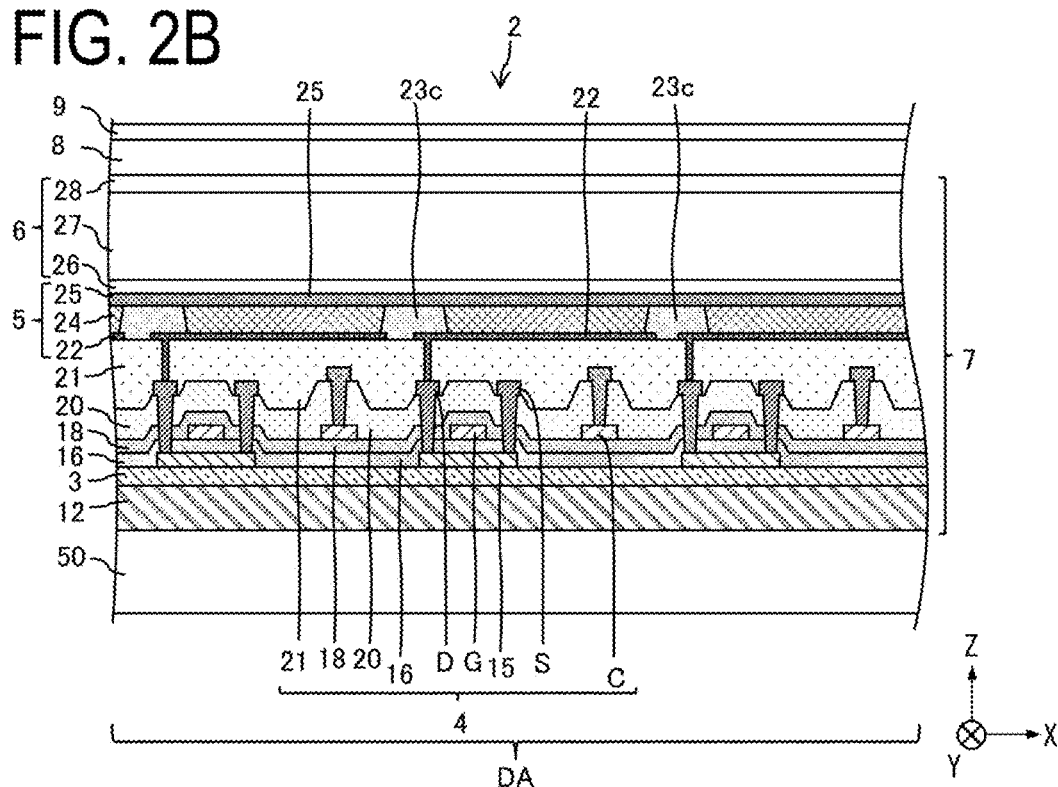
FIG. 2B is a cross-sectional view illustrating an exemplar configuration of the display device (active region) at a stage in the manufacturing step according to some embodiments of the disclosure.
Figure 3A:
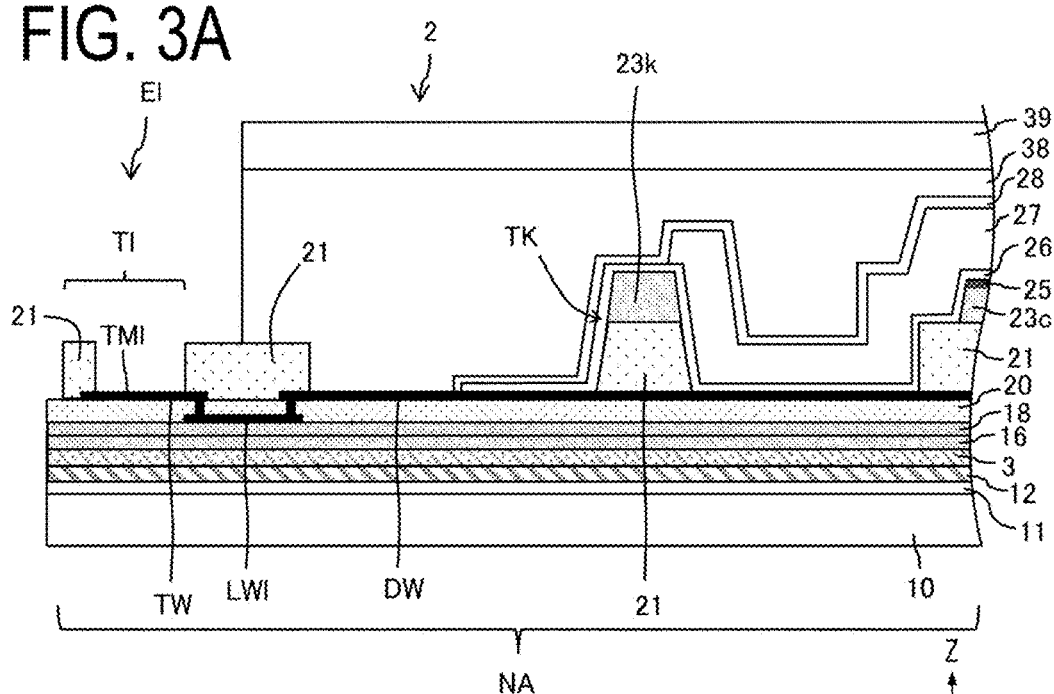
FIGS. 3A and 3B are cross-sectional views illustrating an exemplar configuration of the display device (non-active region) according to some embodiments of the disclosure.
Figure 3B:
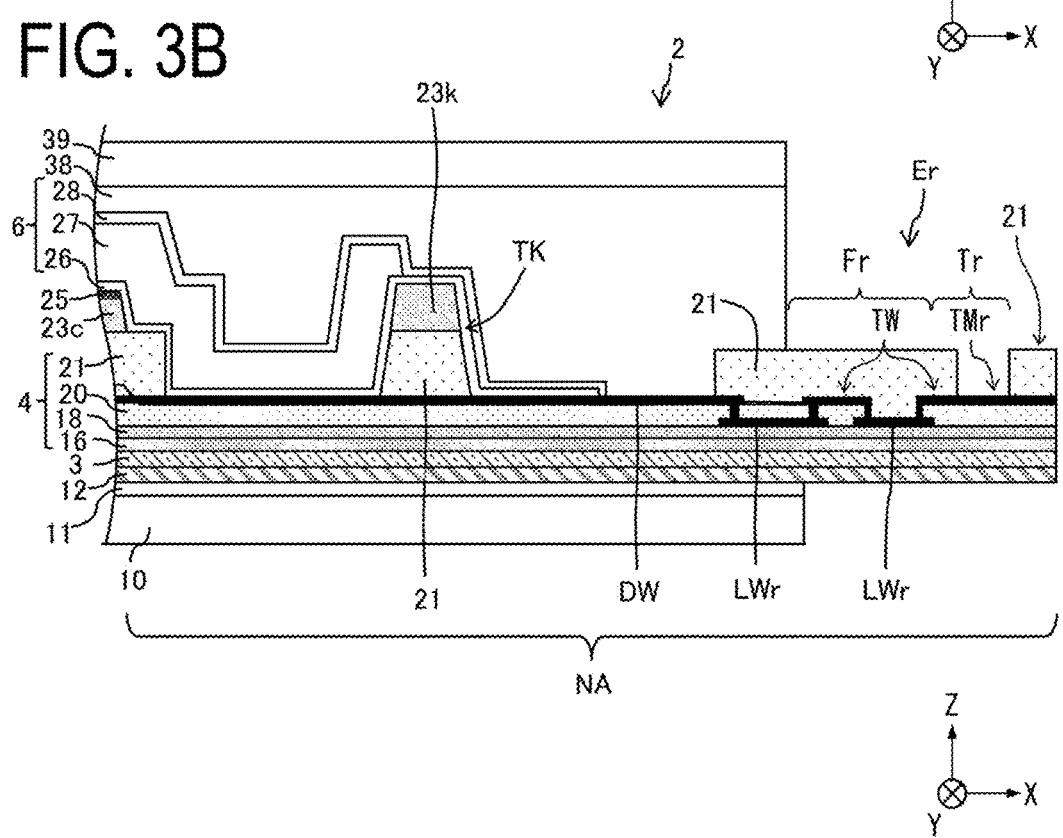

FIG. 1 is a flowchart illustrating a method for manufacturing a display device including a plurality of display units (flexible display bodies). FIG. 2A is a cross-sectional view illustrating an exemplar configuration of a display unit (active region) of a first embodiment. FIG. 2B is a cross-sectional view illustrating an exemplar configuration of the display unit (active region) of the first embodiment at a stage in the manufacturing step thereof. FIGS. 3A and 3B are cross-sectional views illustrating an exemplar configuration of the display unit (non-active region) of the first embodiment.

As illustrated in FIG. 1 and FIG. 2B, a resin layer 12 is formed on a transparent support body 50 (e.g., glass substrate) (Step S1). Next, a barrier layer 3 is formed (Step S2). Next, a TFT layer 4 is formed (Step S3). Next, a light emitting element layer (e.g., an OLED element layer) 5 is formed (Step S4). Next, a sealing layer 6 is formed (Step S5). Next, an upper face film 9 is bonded to the sealing layer 6 via an adhesive layer 8 (Step S6).

Next, the lower surface of the resin layer 12 is irradiated with a laser light through the support body 50 (Step S7). Here, the resin layer 12 absorbs the laser light with which the lower surface of the support body 50 has been irradiated and which has passed through the support body 50. As a result, the lower surface of the resin layer 12 (i.e., the interface with the support body 50) is altered by abrasion, and the bonding force between the resin layer 12 and the support body 50 weakens. Next, the support body 50 is peeled off from the resin layer 12 (Step S8). Next, a lower face film 10 (e.g., PET) is bonded to the lower surface of the resin layer 12 via an adhesive layer 11 (Step S9). Next, the resultant multilayer body with the lower face film attached is divided to obtain individual pieces (Step S10). Next, an upper face film 9 on each of terminal portions Tl and Tr of the TFT layer 4 is peeled off to expose the terminals (Step S11). Next, a functional film 39 is bonded via an adhesive layer 38 (Step S12). Thus individual pieces of the flexible display units 2 such as ones illustrated in FIG. 2A and FIGS. 3A and 3B, are obtained. Next, adjacent display units 2 are coupled together (Step S13). Next, an electronic circuit board 45 is mounted on one of the left-hand-side terminal portions Tl of the TFT layer 4 of the display unit 2, that one being not connected to the right-hand-side terminal portion Tr of the adjacent display unit 2 (Step S14). Note that each of the above-described steps is performed by a display device manufacturing apparatus.

Examples of the material used in the lower face film 10 include polyethylene terephthalate (PET). Examples of the material of the resin layer 12 include polyimide, epoxy, and polyamide.

The barrier layer 3 is a layer that inhibits moisture or impurities from reaching the TFT layer 4 or a light emitting element layer 5 when the display device is being used, and can be constituted by a silicon oxide film, a silicon nitride film, or a silicon oxynitride film, or by a layered film of these, formed by use of a CVD method. The thickness of the inorganic barrier layer 3 is, for example, from 50 nm to 1500 nm.

TFT layer 4 includes: a semiconductor film 15; a gate insulating film 16 formed in an upper layer than the semiconductor film 15; a gate electrode G formed in an upper layer than the gate insulating film 16; passivation films 18 and 20 formed in an upper layer than the gate electrode G; a capacitance electrode C and the terminals TMl and TMr formed in an upper layer than the passivation film 18; a source wiring line S and a drain wiring line D formed in an upper layer than the passivation film 20; and an organic interlayer film (flattening film) 21 formed in an upper layer than the source wiring line S and the drain wiring line D. A thin film transistor (TFT) is configured to include the semiconductor film 15, the gate insulating film 16, and the gate electrode G. In edges of the TFT layer 4, a plurality of terminals TMl and TMr used for connection with the electronic circuit board are formed.

The semiconductor film 15 is formed of, for example, low-temperature polysilicon (LTPS) or an oxide semiconductor. A semiconductor film 15 formed of a low-temperature polysilicon and a semiconductor film 15 formed of an oxide semiconductor, can be formed. The gate insulating film 16 can be, for example, a silicon oxide (SiOx) film, a silicon nitride (SiNx) film, or a layered film thereof formed by use of a CVD method. The gate electrode G, the source electrode S, the drain electrode D, and the terminals are formed of a metal single layer film or a layered film including, for example, at least one of aluminum (Al), tungsten (W), molybdenum (Mo), tantalum (Ta), chromium (Cr), titanium (Ti), or copper (Cu). Note that, in FIGS. 2A and 2B, the TFT is illustrated that has a top gate structure in which the semiconductor film 15 is the channel, but the TFT may have a bottom gate structure (when the TFT channel is the oxide semiconductor, for example).

The inorganic insulating films 16, 18, and 20 can be a silicon oxide (SiOx) film, a silicon nitride (SiNx) film, or a layered film of these, formed by use of a CVD method.

The flattening film 21 may be formed of a coatable photosensitive organic material, such as a polyimide material or an acrylic material. The flattening film 21 of the active region (i.e., a region that overlaps the light emitting element layer 5, and the display region) functions as an underlayer of the light emitting element layer 5.

An anode electrode 22 is photoreflective and is formed by the layering of Indium Tin Oxide (ITO) and an alloy containing Ag.

The light emitting element layer 5 (e.g., an organic light emitting diode layer) includes a first electrode 22 (e.g., anode electrode) formed in an upper layer than the flattening film 21; a bank 23c covering the edges of the first electrode 22; an electro luminescence (EL) layer 24 formed in an upper layer than the first electrode 22; and a second electrode 25 formed in an upper layer than the EL layer 24. The first electrode 22, the EL layer 24, and the second electrode 25 together form a light emitting element (e.g., organic light emitting diode).

In the non-active region NA (i.e., frame region), a frame-shaped protrusion TK surrounding the active region DA is formed. The protrusion TK defines an edge of the organic sealing film 27 (e.g., an organic film formed by an ink-jet method). As illustrated in FIGS. 3A and 3B, the protrusion TK includes a lower portion formed of the flattening film 21 and an upper portion formed of an organic insulating film 23k.

The bank 23c and the organic insulating film 23k can be formed in the same step. For example, a coatable photosensitive organic material, such as a polyimide and an acrylic material, is applied to the active region DA and the non-active region NA by an ink-jet method.

The EL layer 24 is formed in a region (subpixel region) surrounded by the bank 23c by a vapor deposition method or an ink-jet method. In a case where the light emitting element layer 5 is an organic light emitting diode (OLED) layer, the EL layer 24 is formed, for example, by layering a hole injecting layer, a hole transport layer, a light emitting layer, an electron transport layer, and an electron injecting layer in this order from the lower layer side. Note that one or more layers of the EL layer 24 may be a shared layer (shared by a plurality of pixels).

The first electrode (anode) 22 is formed by layering of, for example, Indium Tin Oxide (ITO) and an alloy including Ag, and has light reflectivity. The second electrode (e.g., a cathode electrode) 25 is a common electrode, and may be formed of a transparent metal such as Indium Tin Oxide (ITO) or Indium Zinc Oxide (IZO).

In a case where the light emitting element layer 5 is an OLED layer, positive holes and electrons are recombined inside the EL layer 24 by a drive current between the anode electrode 22 and the cathode electrode 25. The recombination generates excitons, and light is emitted when the excitons fall into a ground state.

The light emitting element layer 5 is not limited to the OLED layer and may be an inorganic light emitting diode layer or a quantum dot light emitting diode layer.

The sealing layer 6 includes: a first inorganic sealing film 26 that covers the bank 23c and the cathode electrode 25; the organic sealing film 27 that is formed in an upper layer than the first inorganic sealing film 26; and a second inorganic sealing film 28 that covers the organic sealing film 27.

Each of the first inorganic sealing film 26 and the second inorganic sealing film 28 may be a silicon oxide film, a silicon nitride film, a silicon oxynitride film, or a layered film thereof formed by a CVD method using a mask. The organic sealing film 27 is a transparent organic insulating film that is thicker than the first inorganic sealing film 26 and the second inorganic sealing film 28, and may be formed of a coatable photosensitive organic material such as a polyimide or an acrylic material. For example, after the first inorganic sealing film 26 is coated by a ink-jet method with an ink containing such an organic material, the ink is cured by UV irradiation. The sealing layer 6 (especially the first inorganic sealing film 26 and the second inorganic sealing film 28) covers the light emitting element layer 5 and inhibits foreign matter, such as water and oxygen, from infiltrating to the light emitting element layer 5.

Note that the upper face film 9 is bonded to the sealing layer 6 via the adhesive layer 8 and functions as a supporting material when the support body 50 is peeled off. Examples of a material of the upper face film 9 include polyethylene terephthalate (PET).

After the support body 50 is peeled off, the lower face film 10 is bonded to the lower face of the resin layer 12. Thus, the display device to be manufactured will have excellent flexibility. An exemplar material of the lower face film 10 is PET. The functional film 39 has, for example, an optical compensation function, a touch sensor function, a protection function, or the like.

As illustrated in FIGS. 3A and 3B, the display unit 2 includes the left-hand-side terminal portion Tl and the right-hand-side terminal portion Tr. The left-hand-side terminal portion Tl is located in a left-hand-side end portion El that is located on the left-hand side (i.e., on the −X side) of the display unit 2. A left-hand-side terminal TMl is formed on the upper surface (i.e., display surface) of the left-hand-side end portion El. The right-hand-side terminal portion Tr is located in a right-hand-side end portion Er that is located on the right-hand side (i.e., +X side) of the display unit 2. A right-hand-side terminal TMr is formed on the upper surface (i.e., display surface) of the right-hand-side end portion Er. Though not illustrated in FIGS. 3A and 3B, the display unit 2 may have an upper-side terminal portion Tu and a lower-side terminal portion Td. The upper-side terminal portion Tu is located in an upper-side end portion Eu that is located on the upper side (i.e., +Y side) of the display unit 2. An upper-side terminal TMu is formed on the upper surface (i.e., display surface) of the upper-side end portion Eu. The lower-side terminal portion Td is located in a lower-side end portion Ed that is located on the lower side (i.e., −Y side) of the display unit 2. A lower-side terminal TMd is formed on the upper surface (i.e., display surface) of the lower-side end portion Ed.

As illustrated in FIG. 3A, the terminal TMl of the left-hand-side terminal portion Tl is connected to a terminal wiring line TW. A lead-out wiring line DW is drawn out from the active region, and the terminal wiring line TW is connected to the lead-out wiring line DW via a relay wiring line LWl. End faces of the terminal TMl, the terminal wiring line TW, and the lead-out wiring line DW are covered with the flattening film 21.

As illustrated in FIG. 3B, a flexible portion Fr is formed in the right-hand-side end portion Er, specifically between the terminal portion Tr and the active region DA. The lower face film 10 and the functional film 39 (and preferably, at least one of the organic insulating films 16, 18, and 20) are partially removed from the flexible portion Fr. The terminal TMr of the right-hand-side terminal portion Tr is connected to the terminal wiring line TW. A lead-out wiring line DW is drawn out from the active region, and the terminal wiring line TW is connected to the lead-out wiring line DW via a relay wiring line LWr. End faces of the terminal TMl, the terminal wiring line TW, and the lead-out wiring line DW are covered with the flattening film 21.

The left-hand-side terminal TMl located on the left-hand side is connected eventually to the right-hand-side terminal TMr located on the right-hand side via: the terminal wiring line TW, the relay wiring line LWl, and the lead-out wiring line DW on the left-hand side; wiring lines (i.e., first signal lines) in the active region, the wiring lines being the ones extending in a first direction from the left-hand side to the right-hand side among the source wiring lines S (i.e., source signal lines) and the gate wiring lines (i.e., gate signal lines); and the lead-out wiring line DW, the relay wiring line LWr, and the terminal wiring line TW on the right-hand side.

On the left-hand-side terminal portion Tl of each display unit 2, the right-hand-side terminal portion Tr of a different, adjacent display unit 2 or an electronic circuit board (e.g., an IC chip and an electronic circuit board such as a flexible printed circuit board) is mounted.

On the right-hand-side terminal portion Tr of each display unit 2, the left-hand-side terminal portion Tl of a different, adjacent display unit 2 or an electronic circuit board (e.g., an IC chip and an electronic circuit board such as a flexible printed circuit board) is mounted. Alternatively, the right-hand-side terminal portion Tr of each display unit 2 may be cut off without anything to be mounted thereon.

Coupling Step

FIGS. 4A to 4E are cross-sectional views illustrating a coupling step (S13) and a mounting step (S14) according to the first embodiment.

Figure 4A:
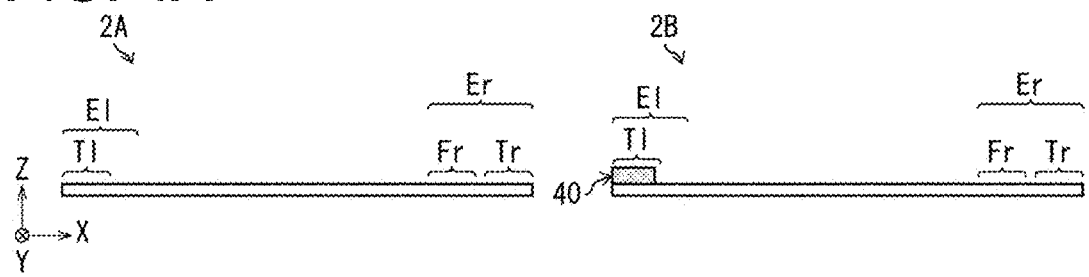
FIGS. 4A to 4E are cross-sectional views illustrating a coupling step and a mounting step according to an embodiment of the disclosure.

Firstly, as illustrated in FIG. 4A, a pair of display units 2 are arranged to be adjacent each other. For the sake of convenience, in FIG. 4A to 4C and in the description provided with reference to these drawings, the display unit 2 illustrated on the left-hand side of FIG. 4A is referred to as a display unit "2A", whereas the display unit 2 illustrated on the right-hand side of FIG. 4A is referred to as a display unit "2B". The pair of display units 2A and 2B may be identical display units or may be not identical display units.

Then, an anisotropic conductive film 40 is bonded to the display surface of the terminal portion Tl located in the left-hand-side end portion El of the display unit 2B (sub step of a first bonding step). Alternatively, an anisotropic conductive film 40 may be bonded to the display surface of the terminal portion Tr located in the right-hand-side end portion Er of the display unit 2A.

Figure 4B:
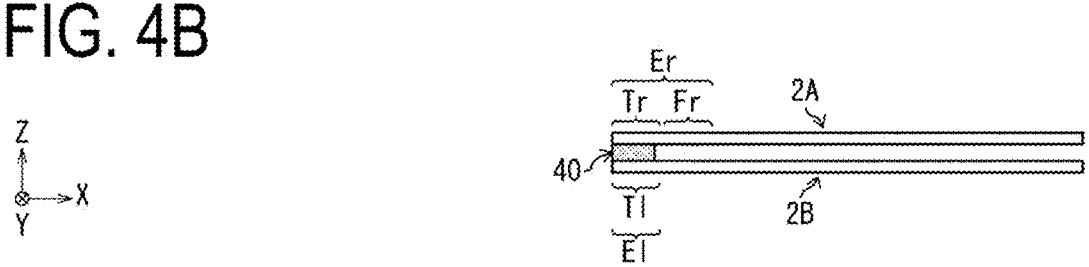

Subsequently, as illustrated in FIG. 4B, the display unit 2A is overlapped on the display unit 2B (specifically, on the display surface of the display unit 2B) to allow: (i) the display surfaces of the display units 2A and 2B to face each other; and (ii) the right-hand-side terminal portion Tr of the display unit 2A to be overlapped on the left-hand-side terminal portion Tl of the display unit 2B. Alternatively, the display unit 2B may be overlapped on the display unit 2A (specifically, on the display surface of the display unit 2A). Hence, the display surface of the right-hand-side terminal portion Tr of the display unit 2A and the display surface of the left-hand-side terminal portion Tl of the display unit 2B face each other with the anisotropic conductive film 40 provided in between.

Then, heat and pressure are added to the terminal portion Tr of the display unit 2A and the terminal portion Tl of the display unit 2B. As a result, the terminal portion Tr of the display unit 2A and the terminal portion Tl of the display unit 2B are bonded together by the anisotropic conductive film 40 (sub step of the first bonding step). At the same time, the right-hand-side terminal TMr formed on the display surface of the terminal portion Tr of the display unit 2A is connected, via the anisotropic conductive film 40, to the left-hand-side terminal TMl formed on the display surface of the terminal portion Tl of the display unit 2B.

Figure 4C:
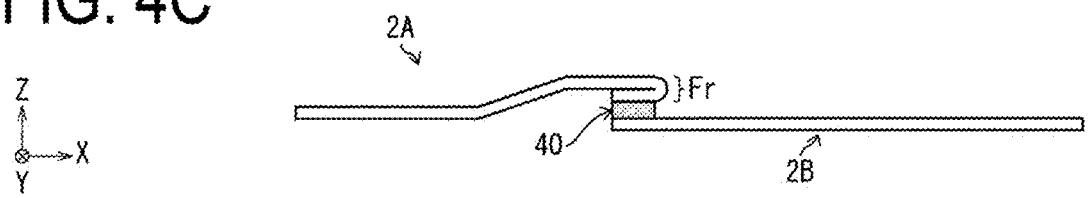

Subsequently, as illustrated in FIG. 4C, the right-hand-side end portion Er of the display unit 2A is bent at the flexible portion Fr located in the right-hand-side end portion Er of the display unit 2A by approximately 180 degrees towards the opposite side of the display surface (first bending step). Thus, the terminal portion Tr of the display unit 2A and the terminal portion Tl of the display unit 2B that have been bonded to each other are hidden behind the display unit 2A from the view from the side of the display surface side.

Hence, the gaps (i.e., breaks of displayed images) between adjacent display units 2 can be reduced, or preferably, can be eliminated. In addition, the display surface of the display unit 2A and the display surface of the display unit 2B can be substantially flush with each other. The thickness of the display unit 2A and the thickness of the anisotropic conductive film 40 after the bonding are typically very thin (e.g., approximately 300 μm and approximately 100 μm, respectively). Hence, the level difference at the joint portion between the display surface of the display unit 2A and the display surface of the display unit 2B is typically very small (e.g., smaller than 1 mm), and consequently does not usually affect the display of the display device 1.

By repeating the above-described coupling operation, three or more display units 2 can be coupled together.

Figure 4D:
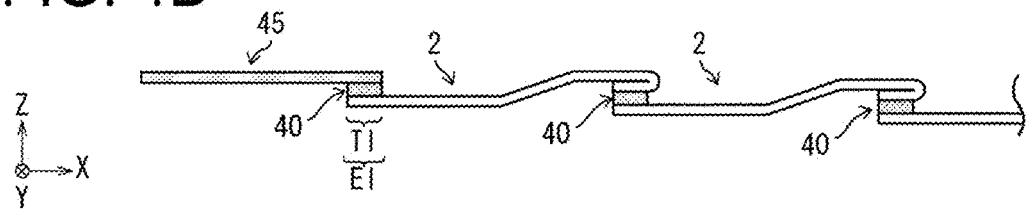

As illustrated in FIG. 4D, in case where the left-hand-side end portion El of a particular display unit 2 is not bonded to the right-hand-side end portion Er of a different display unit 2, an electronic circuit board 45 (first circuit board) may be mounted on the left-hand-side end portion El of the particular display unit 2 to allow the left-hand-side terminals TMl of the left-hand-side end portion El to be electrically connected to the input/output terminals of the electronic circuit board 45 (first circuit board mounting step). Though not illustrated, in case where the right-hand-side end portion Er of a particular display unit 2 is not bonded to the left-hand-side end portion El of a different display unit 2, an electronic circuit board 45 (second circuit board) may be mounted on the right-hand-side end portion Er of the particular display unit 2 to allow the right-hand-side terminal TMr of the right-hand-side end portion Er to be electrically connected to the input/output terminals of the electronic circuit board 45 (second circuit board mounting step). In this way, the electronic circuit board 45 can be mounted on the left-hand-side end portion El and/or the right-hand-side end portion Er. Hence, all the display units 2 can omit the driving circuit configured to drive the source wiring lines S or the gate wiring lines. Accordingly, all the display unit 2 may have identical configurations. In addition, a gate driving circuit configured to drive the gate wiring lines may be provided in the active region DA of each display unit 2. In this case, the first signal lines may be wiring lines configured to supply signals to the gate driving circuit, and the electronic circuit board 45 may be provided with a wiring line to supply signals to the gate driving circuit.

Figure 4E:
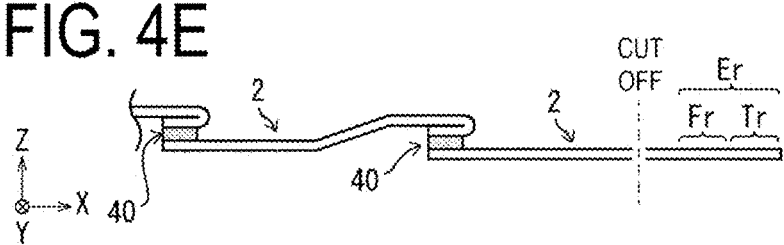

As illustrated in FIG. 4E, in a case where the right-hand-side end portion Er of a particular display unit 2 is not bonded to the left-hand-side end portion El of a different display unit 2, the right-hand-side end portion Er of the particular display unit 2 may be cut off (first cut-off step). In this way, if the end portion is not necessary, such an end portion can be cut off. Hence, each one of the display units 2 can be provided with a left-hand-side terminal portion Tl in its left-hand-side end portion El and a right-hand-side terminal portion Tr in its right-hand-side end portion Er. Accordingly, all the display unit 2 may have identical configurations.

Display Device

Figure 5A:
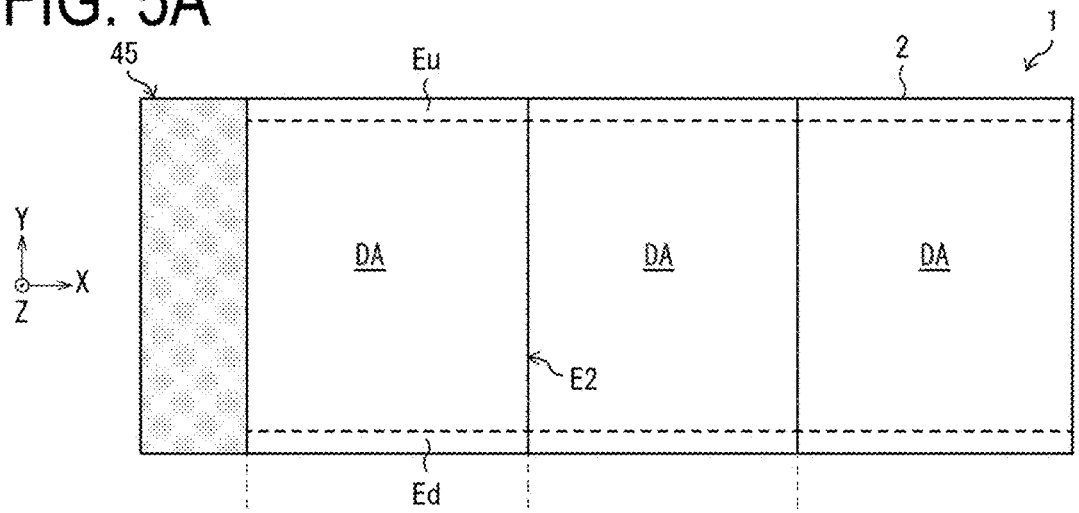
FIG. 5A is a plan view illustrating an exemplar configuration of a display device, seen from the display surface side, according to an embodiment of the disclosure.
Figure 5B:
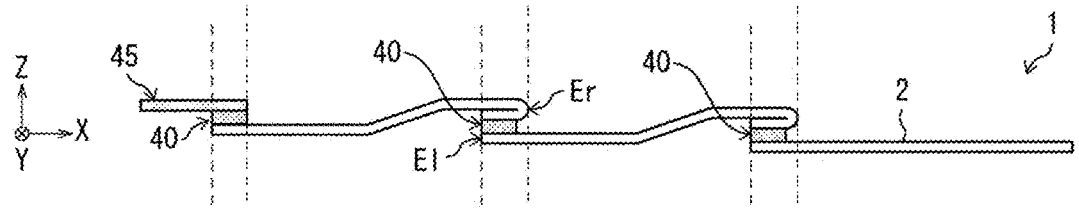
FIG. 5B is a cross-sectional view of the exemplar configuration.

FIG. 5A is a plan view illustrating an exemplar configuration of the display device 1, seen from the display surface side, according to the first embodiment. FIG. 5B is a cross-sectional view of the exemplar configuration, and FIG. 5C is a plan view of the exemplar configuration seen from the opposite side to the display surface.

Figure 5C:
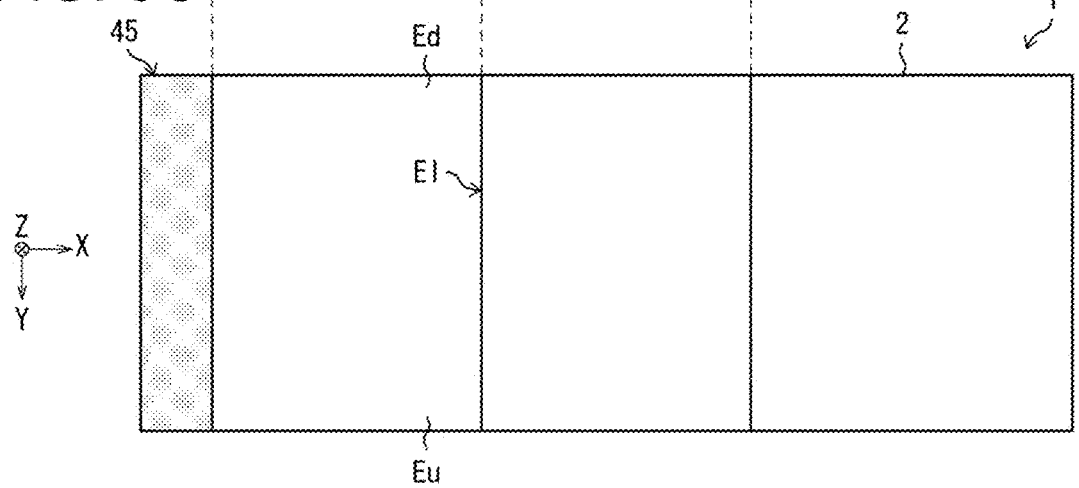
FIG. 5C is a plan view of the exemplar configuration seen from the opposite side to the display surface.

As illustrated in FIGS. 5A to 5C, the display device 1 includes a plurality of display units 2 and an electronic circuit board 45.

The electronic circuit board 45 is mounted on the left-hand-side end portion El of the leftmost display unit 2 in FIGS. 5A to 5C. Hence, the electronic circuit board 45 is coupled to the plurality of display units 2 that are coupled to one another.

In a case of an adjacent pair of the display units 2, the left-hand-side end portion El of one of the display units 2 is bonded to the right-hand-side end portion Er of the other one of the display units 2. Hence, the plurality of display units are coupled to each other.

The plurality of mutually coupled display units 2 have their respective display surfaces that are substantially flush with one another. Hence, the plurality of active regions DA of the plurality of mutually coupled display unit 2 can be visually recognized as an integrated, single active region that the display device 1 includes.

In the case of an adjacent pair of display units 2, the active regions DA of such display units 2 are arranged to leave smaller gaps in between, and may be arranged preferably to leave as small gaps as to make them visually unrecognizable. Hence, the breaks of displayed images between the active regions of the display device 1 are as small as, preferably unrecognizable visually.

Modified Examples

FIG. 6 to FIGS. 9A and 9B are cross-sectional views illustrating various modified examples of the coupling step (S13) according to the first embodiment.

Figure 8A:
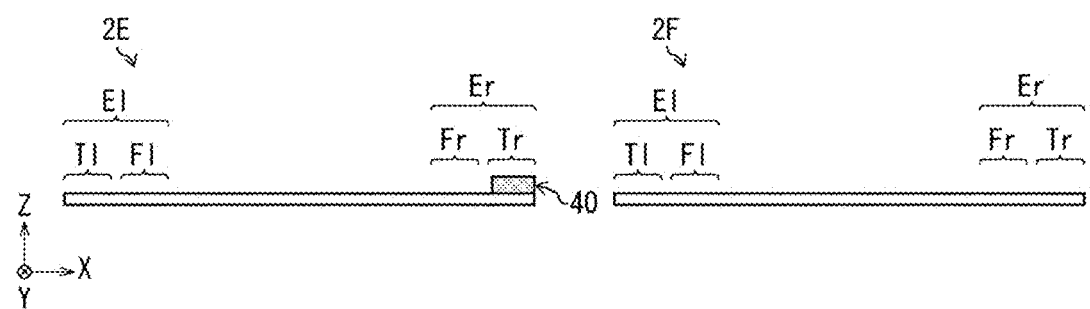
FIGS. 8A and 8B are cross-sectional views illustrating a still different exemplar one of various modified examples of the coupling step illustrated in FIGS. 4A to 4E.
Figure 8B:
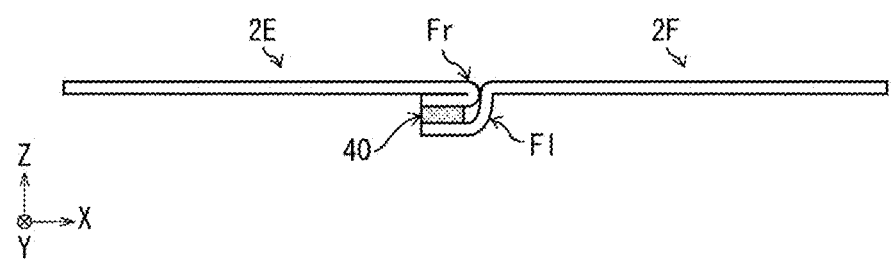
Figure 9A:
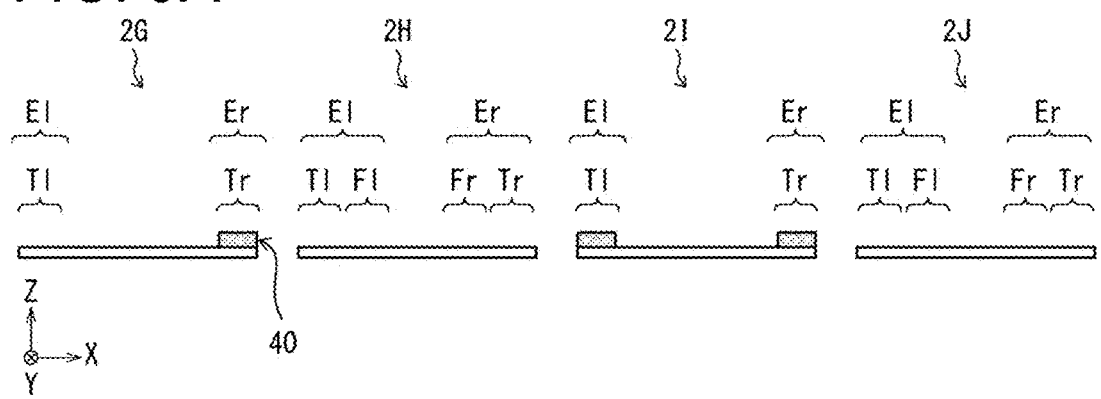
FIGS. 9A and 9B are cross-sectional views illustrating an even still different exemplar one of various modified examples of the coupling step illustrated in FIGS. 4A to 4E.

For the sake of convenience, in FIGS. 7A and 7B and in the description provided with reference to these drawings, the display unit 2 illustrated on the left-hand side of FIG. 7A is referred to as a display unit "2C", whereas the display unit 2 illustrated on the right-hand side of FIG. 7A is referred to as a display unit "2D". In addition, in FIGS. 8A and 8B and in the description provided with reference to these drawings, the display unit 2 illustrated on the left-hand side of FIG. 8A is referred to as a display unit "2E", whereas the display unit 2 illustrated on the right-hand side of FIG. 8A is referred to as a display unit "2F". In addition, in FIGS. 9A and 9B and in the description provided with reference to these drawings, the leftmost display unit illustrated in FIG. 9A is referred to as a display unit "2G", the second leftmost display unit 2 illustrated in FIG. 9A is referred to as a display unit "2H", the second rightmost display unit 2 illustrated in FIG. 9A is referred to as a display unit "2I", and the rightmost display unit illustrated in FIG. 9A is referred to as a display unit "2J".

For example, as illustrated in FIG. 6, prior to the mutual bonding of the adjacent pair of display units 2A and 2B, the right-hand-side end portion Er of the display unit 2A may be bent at the flexible portion Fr located in the right-hand-side end portion Er of the display unit 2A by approximately 180 degrees towards the opposite side of the display surface. In this case, as illustrated in FIG. 4C, the terminal portion Tr of the display unit 2A and the terminal portion Tl of the display unit 2B can be bonded together to allow the display surface of the terminal portion Tr and the display surface of the terminal portion Tl: (i) to face and overlap each other with the anisotropic conductive film 40 provided in between; and (ii) subsequently to be bonded to each other via the anisotropic conductive film 40. Note that from the workability's viewpoint, it is preferable, as illustrated in FIG. 4B, to bond the right-hand-side end portion Er of the display unit 2A to the left-hand-side end portion El of the display unit 2B before the right-hand-side end portion Er of the display unit 2A is bent.

For example, a flexible portion Fl may be formed in the left-hand-side end portion El at a position between the terminal portion Tl and the active region DA as illustrated in FIG. 7A, instead of forming the flexible portion Fr in the right-hand-side end portion Er. In this case, as illustrated in FIG. 7B, the left-hand-side end portion El of the display unit 2B can be bent at the flexible portion Fl located in the left-hand-side end portion El of the display unit 2B by approximately 180 degrees towards the opposite side of the display surface.

For example, as illustrated in FIG. 8A, the flexible portion Fr in the right-hand-side end portion Er can be formed and the flexible portion Fl in the left-hand-side end portion El can also be formed. In this case, as illustrated in FIG. 8B, while the right-hand-side end portion Er of the display unit 2A and the left-hand-side end portion El of the display unit 2B are bonded to each other, both the right-hand-side end portion Er of the display unit 2A and the left-hand-side end portion El of the display unit 2B can be bent.

Figure 9B:
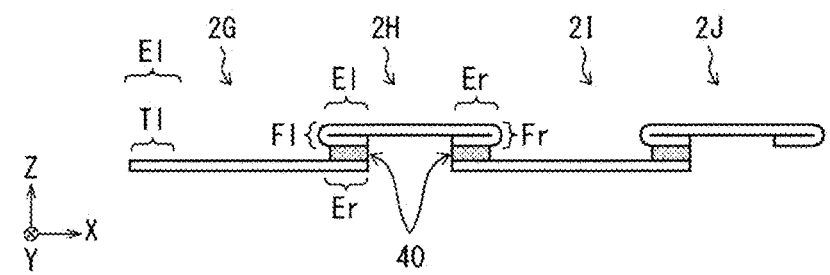

For example, as illustrated in FIG. 9A, two different types of display units can be provided: the display units 2G and 2I of a first type where no flexible portion is formed in any of the left-hand-side end portion El and the right-hand-side end portion Er; and the display units 2H and 2J of a second type where the flexible portions Fl and Fr are formed respectively in the left-hand-side end portion El and the right-hand-side end portion Er. In this case, as illustrated in FIG. 9B, the display unit 2H where the flexible portions Fl and Fr are formed respectively in the two end portions El and Er is bonded between the display units 2G and 2I where no flexible portion is formed in any of the two end portions El and Er. In addition, the display unit 2I where no flexible portion is formed any of the two end portions El and Er is bonded between the display units 2H and 2J where the flexible portions Fl and Fr are formed respectively in the two end portions El and Er.

In the case of bonding as illustrated in FIG. 9, a display body that is not flexible ("non-flexible display body", for short) may be used as each of the display units 2G and 2I where no flexible portion is formed in any of the two end portions. The non-flexible display body can be manufactured, for example, in a manufacturing step including all the manufacturing steps of the flexible display body (Step S1 to Step S12) except for the steps for replacing the transparent support body 50 (e.g., glass substrate) with the lower face film 10 (Step S7 to Step S9). The non-flexible display body tends to be manufactured through fewer manufacturing steps than the manufacturing steps needed for the flexible display body. Hence, the non-flexible display body tends to have a higher yield and a lower manufacturing cost than the flexible display body. Accordingly, the use of the non-flexible display bodies as the display units 2G and 2I where no flexible portion is formed in any of the end portions helps improve the yield of the display device 1 and reduce the cost of manufacturing the display device 1.

In addition, three or more display units 2 through any combination of various coupling ways such as ones illustrated in FIG. 4C, FIG. 7B, FIG. 8B, and FIG. 9B, can be coupled.

It is preferable to repeat only the coupling way illustrated in FIG. 4C, and bend only the right-hand-side end portions Er. In this case, no display unit 2 has a left-hand-side end portion El with a flexible portion formed therein, but every display unit 2 has a right-hand-side end portion Er with a flexible portion Fr formed therein. Accordingly, all the display unit 2 may have identical configurations. Alternatively, it is preferable to repeat only the coupling way illustrated in FIG. 7B and bend only the left-hand-side end portions El. In this case, every display unit 2 has a left-hand-side end portion El with a flexible portion Fl formed therein, but no display unit 2 has a right-hand-side end portion Er with a flexible portion formed therein. Accordingly, all the display unit 2 may have identical configurations.

Second Embodiment

According to the above-described first embodiment, the plurality of display units 2 are coupled together along only one direction (i.e., in the X-axis direction) through the bonding of each of the left-hand-side end portions El to the corresponding one of the right-hand-side end portions Er. The scope of the disclosure is not limited to such an embodiment, but the plurality of display unit 2 may be coupled together along a plurality of directions that cross each other.

A display device 1 including a plurality of display unit 2 that are coupled together along two different directions of the X-axis direction (first direction) and the Y-axis direction (second direction) will be described below with reference to FIG. 10A to FIG. 18.

Figure 10A:
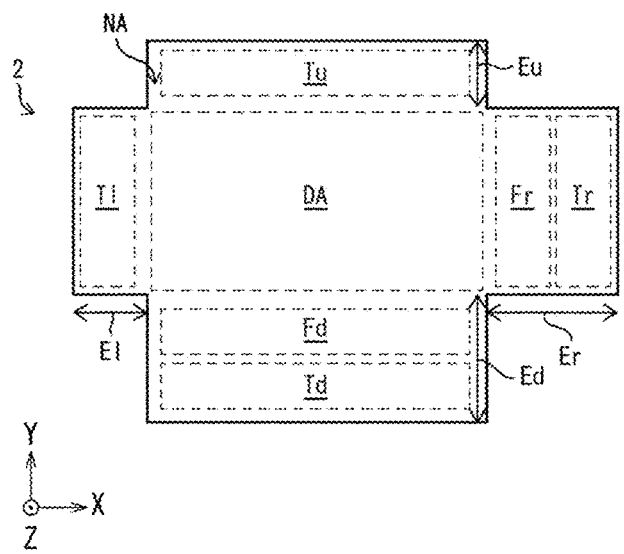
FIGS. 10A to 10C are plan views illustrating a coupling step according to a different embodiment of the disclosure.
Figure 10B:
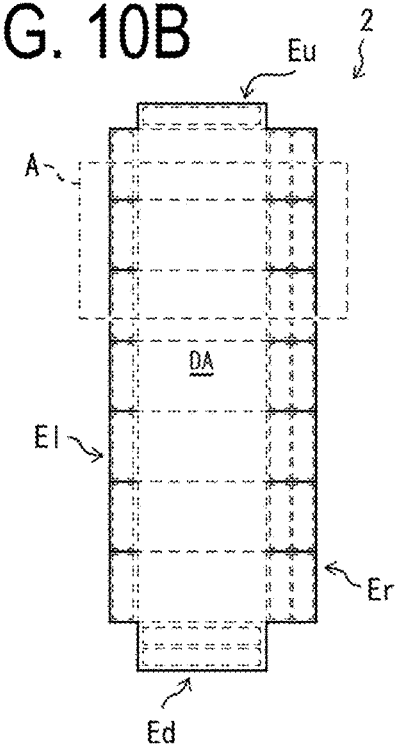
Figure 10C:
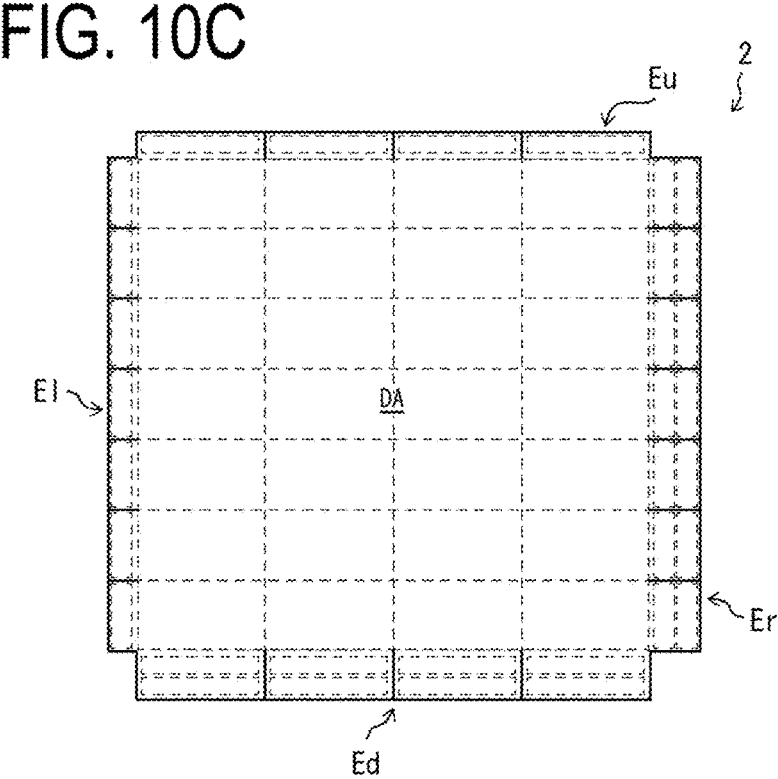

FIGS. 10A to 10C are plan views illustrating a coupling step (S13) according to the second embodiment.

As illustrated in FIG. 10A, the display unit 2 of the second embodiment includes a non-active region NA having: a left-hand-side end portion El on the −X side; a right-hand-side end portion Er on the +X side; an upper-side end portion Eu on the +Y side; and a lower-side end portion Ed on the −Y side.

The display unit 2 may preferably have a rectangular shape with four corners cut away to separate the four end portions El, Er, Eu, and Ed from one another (i.e., a cross-like shape). In a case of such a shape, once the display units 2 are coupled to one another, the shape can reduce the thickness of the coupled display units 2 at and near the four meeting points of the coupled display unit 2 and thus reduce the level difference between the display surfaces of every two adjacent display units 2.

The display unit 2 has, on the −X side, the left-hand-side end portion El including a left-hand-side terminal portion Tl on whose display surface a left-hand-side terminal TMl is formed. In addition, the display unit 2 has: on the +X side, the right-hand-side end portion Er including a right-hand-side terminal TMr on whose display surface a right-hand-side terminal portion Tr is formed; and a flexible portion Fr located between an active region DA and the right-hand-side terminal portion Tr. Likewise, the display unit 2 has, on the +Y side, an upper-side end portion Eu including an upper-side terminal portion Tu on whose display surface an upper-side terminal TMu is formed. In addition, the display unit 2 has: on the −Y side, the lower-side end portion Ed including a lower-side terminal portion Td on whose display surface a lower-side terminal TMd is formed; and a flexible portion Fd located between an active region DA and the lower-side terminal portion Td.

The left-hand-side terminal TMl and the right-hand-side terminal TMr are electrically connected to a first ones of source wiring lines S and gate wiring lines in the active region (wiring lines extending along the X-axis direction from the left-hand-side end portion El to the right-hand-side end portion Er; i.e., first signal lines). On the other hand, the upper-side terminal TMu and the lower-side terminal TMd are electrically connected to a second ones of the source wiring lines S and the gate wiring lines in the active region (wiring lines extending along the Y-axis direction from the upper-side end portion Eu to the lower-side end portion Ed; i.e., second signal lines).

The plurality of display unit 2 are coupled together in the Y-axis direction as illustrated in FIG. 10B, and are also coupled together in the X-axis direction as illustrated in FIG. 10B. Alternatively, the plurality of display unit 2 may be coupled together in the X-axis direction, and may also be coupled together in the Y direction.

Coupling Step in Y-Axis Direction

FIGS. 11A to 11D are cross-sectional views illustrating a coupling step in a Y-axis direction included in a coupling step (S13) of the second embodiment, each cross-sectional view being taken by cutting in the upper-side end portion Eu and in the lower-side end portion Ed as well as in the active region DA.

Firstly, as illustrated in FIG. 11A, a pair of display units 2 are arranged to be adjacent each other in the Y-axis direction. For the sake of convenience, in FIGS. 11A to 11C and in the description provided with reference to these drawings, the display unit 2 illustrated on the upper side of FIG. 11A is referred to as a display unit "2K", whereas the display unit 2 illustrated on the lower side of FIG. 11A is referred to as a display unit "2L". The pair of display units 2K and 2L may be identical display units or may be not identical display units.

Then, an anisotropic conductive film 40 is bonded to the display surface of the terminal portion Tu located in the upper-side end portion Eu of the display unit 2L (sub step of a second bonding step). Alternatively, an anisotropic conductive film 40 may be bonded to the display surface of the terminal portion Td located in the lower-side end portion Ed of the display unit 2L.

Then, as illustrated in FIG. 11B, the display unit 2K is overlapped on the display unit 2L (specifically, on the display surface of the display unit 2L) to allow: (i) the display surfaces of the display units 2K and 2L to face each other; and (ii) the lower-side terminal portion Td of the display unit 2K to be overlapped on the upper-side terminal portion Tu of the display unit 2L. Alternatively, the display unit 2L may be overlapped on the display unit 2K (specifically, on the display surface of the display unit 2K). Hence, the display surface of the lower-side terminal portion Td of the display unit 2K and the display surface of the upper-side terminal portion Tu of the display unit 2L face each other with the anisotropic conductive film 40 provided in between.

Then, heat and pressure are added to the terminal portion Td of the display unit 2K and the terminal portion Tu of the display unit 2L. As a result, the terminal portion Td of the display unit 2K and the terminal portion Tu of the display unit 2L are bonded together by the anisotropic conductive film 40 (sub step of the second bonding step). At the same time, the lower-side terminal TMd formed on the display surface of the terminal portion Td of the display unit 2K is connected, via the anisotropic conductive film 40, to the upper-side terminal TMu formed on the display surface of the terminal portion Tu of the display unit 2L.

Subsequently, as illustrated in FIG. 11C, the lower-side end portion Ed of the display unit 2K is bent at the flexible portion Fd located in the lower-side end portion Ed of the display unit 2K by approximately 180 degrees towards the opposite side of the display surface (second bending step). Thus, the terminal portion Td of the display unit 2K and the terminal portion Tu of the display unit 2L that have been bonded to each other are hidden behind the display unit 2K from the view from the display-surface side. In addition, the display surface of the display unit 2K and the display surface of the display unit 2L can be substantially flush with each other.

By repeating the above-described coupling operation, three or more display units 2 can be coupled together in the Y-axis direction.

Similar to the case of the left-hand-side end portion El, in a case where the upper-side end portion Eu of a particular display unit 2 is not bonded to the lower-side end portion El of a different display unit 2, an electronic circuit board 45 (third circuit board) may be mounted on the upper-side end portion Eu of the particular display unit 2 to allow each upper-side terminals TMu of the upper-side end portion Eu to be electrically connected to each input/output terminals of the electronic circuit board 45 (third circuit board mounting step). In addition, in case where the lower-side end portion Ed of a particular display unit 2 is not bonded to the upper-side end portion Eu of a different display unit 2, an electronic circuit board 45 (fourth circuit board) may be mounted on the lower-side end portion Ed of the particular display unit 2 to allow each lower-side terminal TMd of the lower-side end portion El to be electrically connected to each input/output terminals of the electronic circuit board 45 (fourth circuit board mounting step). Similar to the case of the right-hand-side end portion Er, in a case where the lower-side end portion Ed of a particular display unit 2 is not bonded to the upper-side end portion Eu of a different display unit 2, the lower-side end portion Ed of the particular display unit 2 may be cut off (second cut-off step).

By repeating the above-described coupling operation in the Y-axis direction, three or more display units 2 can be coupled together in the Y-axis direction.

Figures 12A, 12B, 12C, 12D:
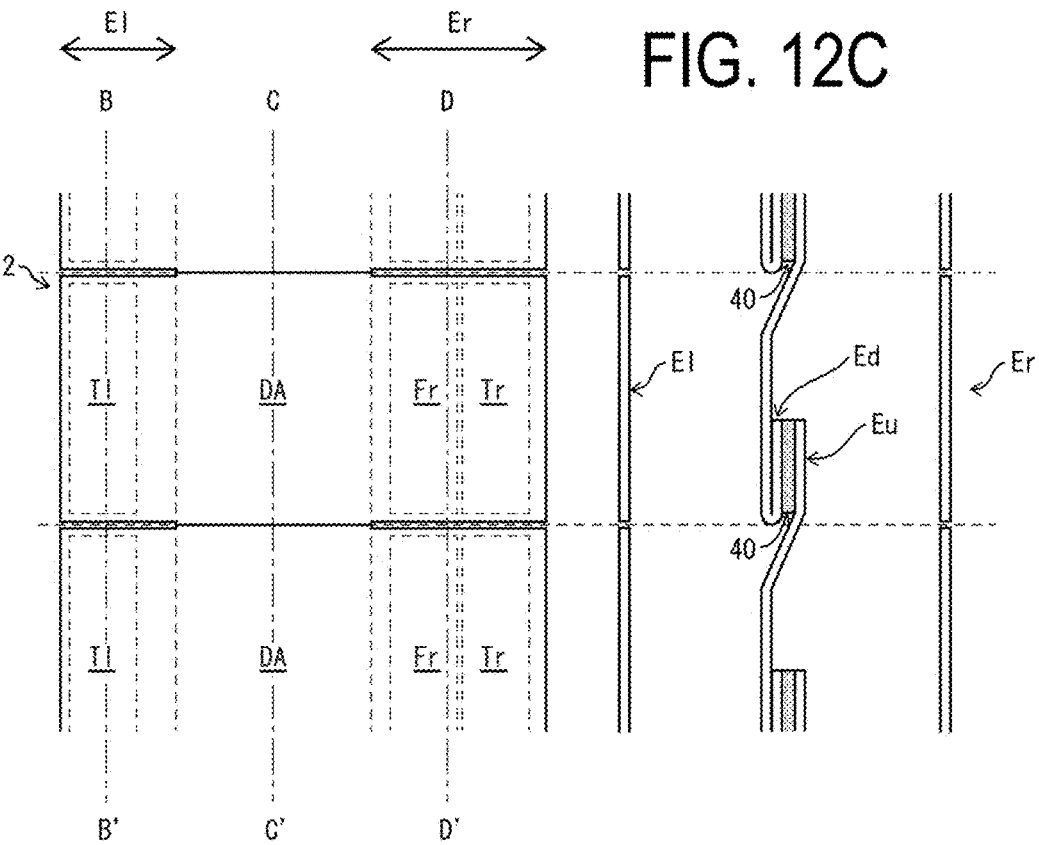
FIG. 12A is an enlarged view of an enclosure A illustrating an exemplar configuration of a display unit coupled as illustrated in FIG. 10B.
FIG. 12B is a cross-sectional view taken along the line B-B' of FIG. 12A.
FIG. 12C is a cross-sectional view taken along the line C-C' of FIG. 12A.
FIG. 12D is a cross-sectional view taken along the line D-D' of FIG. 12A.

FIG. 12A is an enlarged view of an enclosure A in FIG. 10B illustrating an exemplar configuration of the display unit 2 coupled in the Y-direction according to the second embodiment. FIG. 12B is a cross-sectional view taken along the line BB' of FIG. 12A. FIG. 12C is a cross-sectional view taken along the line CC' of FIG. 12A. FIG. 12D is a cross-sectional view taken along the line DD' of FIG. 12A. The BB' cross section illustrated in FIG. 12B is a cross section taken by cutting the left-hand-side end portion El. The CC' cross section illustrated in FIG. 12C is a cross section taken by cutting in the upper-side end portion Eu, the lower-side end portion Ed, and the active region DA. The cross section DD' illustrated in FIG. 12D is a cross section taken by cutting the right-hand-side end portion Er.

As illustrated in FIGS. 12A to 12D, it is preferable that when the display units 2 are coupled together in the Y-axis direction, the left-hand-side end portions El of the display units 2 that are adjacent to each other in the Y-axis direction should not be bonded to each other. This is because, in a case where such left-hand-side end portions El are bonded to each other, each of the bonded portions becomes thicker than otherwise, and such thicker bonded portions create level differences in—and thus adversely affect—the display surface after the coupling in the X-axis direction. In addition, by taking a certain manufacturing error into account, it is preferable that the left-hand-side end portions El be separated from each other so as not to allow the left-hand-side end portions El to overlap each other. Likewise, it is preferable that the right-hand-side end portions Er of the display units 2 that are adjacent to each other in the Y-axis direction not to be mutually bonded to each other, and that such right-hand-side end portions Er be separated from each other.

As illustrated in FIG. 10D and similar to the case of the left-hand-side end portion El, in case where the upper-side end portion Eu of a particular display unit 2 is not bonded to the lower-side end portion El of a different display unit 2, an electronic circuit board 45 may be mounted on the upper-side end portion Eu of the particular display unit 2 to allow the upper-side terminals TMu of the upper-side end portion Eu to be electrically connected to each input/output terminals of the electronic circuit board 45. In addition, though not illustrated and similar to the case of the right-hand-side end portion Er, in a case where the lower-side end portion Ed of a particular display unit 2 is not bonded to the upper-side end portion Eu of a different display unit 2, an electronic circuit board 45 may be mounted on the lower-side end portion Ed of the particular display unit 2 to allow the lower-side terminal TMd of the lower-side end portion El to be electrically connected to the input/output terminals of the electronic circuit board 45. In addition, in a case where the lower-side end portion Ed of a particular display unit 2 is not bonded to the upper-side end portion Eu of a different display unit 2, the lower-side end portion Ed of the particular display unit 2 may be cut off.

Coupling Step in X-Axis Direction

Of the processes included in the coupling step (S13) according to the second embodiment, the coupling step in the X-axis direction is similar to its counterpart in the above-described coupling step (S13) according to the first embodiment, and thus description is omitted.

Display Device

Figure 13A:
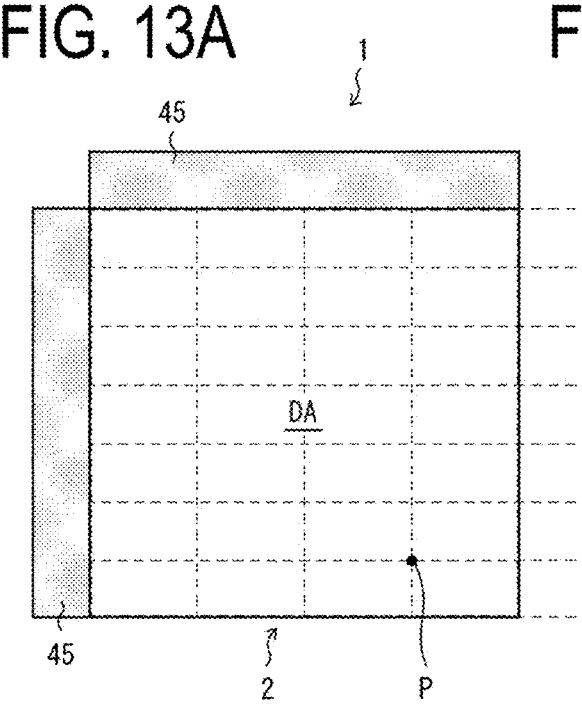
FIG. 13A is a plan view illustrating an exemplar configuration of a display device, seen from the display surface side, according to a different embodiment of the disclosure.
Figure 13B:
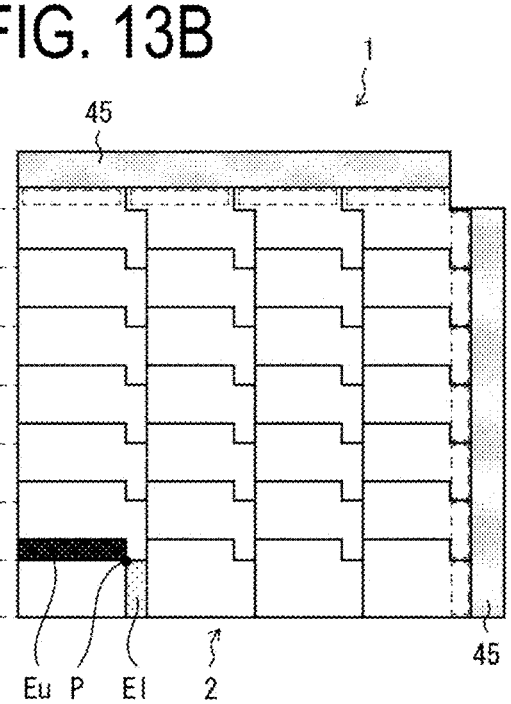
FIG. 13B is a plan view of the exemplar configuration seen from the opposite side to the display surface.

FIG. 13A is a plan view illustrating an exemplar configuration of the display device 1, viewed from the display surface side, according to the second embodiment. FIG. 13B is a plan view of the exemplar configuration viewed from the opposite side to the display surface.

As illustrated in FIGS. 13A and 13B, the display device 1 includes a plurality of display units 2 and two electronic circuit boards 45.

One of the electronic circuit boards 45 is mounted on the left-hand-side end portion El of the leftmost display unit 2 in FIG. 13A. The other one of the electronic circuit boards 45 is mounted on the end portions Ed of the lowermost display units 2 in FIGS. 13A and 13B. Hence, the two electronic circuit boards 45 are coupled to the plurality of display units 2 that are coupled to one another.

In a case of each pair of the display units 2 that are adjacent to each other in the X-axis direction, the left-hand-side end portion El of one of the display units 2 is bonded to the right-hand-side end portion Er of the other one of the display units 2. In a case of each pair of the display units 2 that are adjacent to each other in the Y-axis direction, the upper-side end portion Eu of one of the display units 2 is bonded to the lower-side end portion Ed of the other one of the display units 2. Hence, the plurality of display units are coupled to each other both in the X-axis direction and in the Y-axis direction.

The plurality of mutually coupled display units 2 have their respective display surfaces that are substantially flush with one another. Hence, the plurality of active regions DA of the plurality of mutually coupled display unit 2 can be visually recognized as an integrated, single active region that the display device 1 includes.

Modified Examples

FIG. 14 to FIG. 17B are cross-sectional views illustrating various modified examples of the coupling step in the Y-axis direction.

Figure 17A:
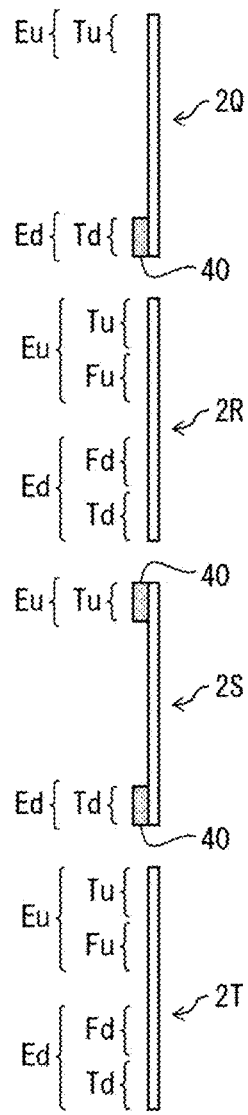
FIGS. 17A and 17B are cross-sectional views illustrating even still different exemplar ones of various modified examples of the coupling step illustrated in FIGS. 11A to 11D.

For the sake of convenience, in FIGS. 15A and 15B and in the description provided with reference to these drawings, the display unit 2 illustrated on the upper side of FIG. 15A is referred to as a display unit "2M", whereas the display unit 2 illustrated on the lower side of FIG. 15A is referred to as a display unit "2N". In addition, in FIGS. 16A and 16B and in the description provided with reference to these drawings, the display unit 2 illustrated on the upper side of FIG. 16A is referred to as a display unit "2O", whereas the display unit 2 illustrated on the lower side of FIG. 16A is referred to as a display unit "2P". In addition, in FIGS. 17A and 17B and in the description provided with reference to these drawings, the uppermost display unit illustrated in FIG. 17A is referred to as a display unit "2Q", the second uppermost display unit 2 illustrated in FIG. 17A is referred to as a display unit "2R", the second lowermost display unit 2 illustrated in FIG. 17A is referred to as a display unit "2S", and the lowermost display unit illustrated in FIG. 17A is referred to as a display unit "2T".

Figure 14:
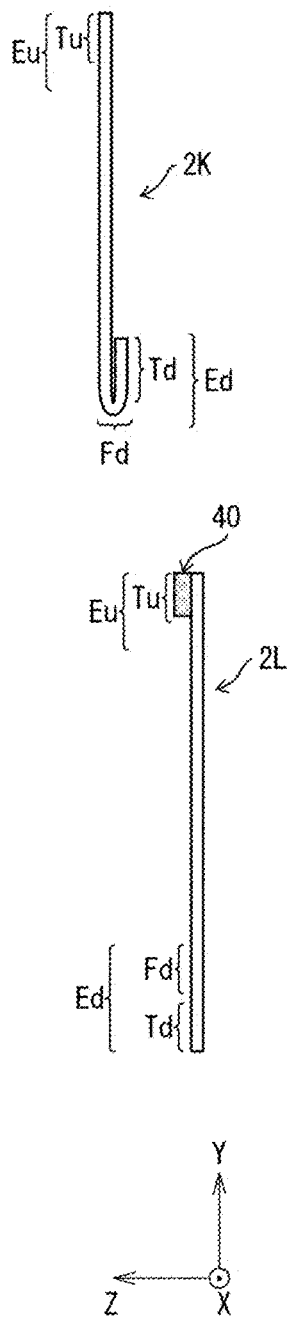
FIG. 14 is a cross-sectional view illustrating an exemplar one of various modified examples of the coupling step illustrated in FIGS. 11A to 11D.

For example, as illustrated in FIG. 14, prior to the mutual bonding of the adjacent pair of display units 2K and 2L, the lower-side end portion Ed of the display unit 2K may be bent at the flexible portion Fd located in the lower-side end portion Ed of the display unit 2K by approximately 180 degrees towards the opposite side of the display surface. In this case, as illustrated in FIG. 11C, the terminal portion Td of the display unit 2K and the terminal portion Tu of the display unit 2L can be bonded together to allow the display surface of the terminal portion Td and the display surface of the terminal portion Tu: (i) to face and overlap each other with the anisotropic conductive film 40 provided in between; and (ii) subsequently to be bonded to each other via the anisotropic conductive film 40. Note that from the workability's viewpoint, it is preferable, as illustrated in FIG. 11B, to bond the lower-side end portion Ed of the display unit 2K to the upper-side end portion Eu of the display unit 2L before the lower-side end portion Ed of the display unit 2K is bent.

For example, as illustrated in FIG. 15A, a flexible portion Fu may be formed in the upper-side end portion Eu at a position between the terminal portion Tu and the active region DA instead of forming the flexible portion Fd in the lower-side end portion Ed. In this case, as illustrated in FIG. 15B, the upper-side end portion Eu of the display unit 2L can be bent at the flexible portion Fu located in the upper-side end portion Eu of the display unit 2L by approximately 180 degrees towards the opposite side of the display surface.

For example, as illustrated in FIG. 16A, it is allowable to form the flexible portion Fd in the lower-side end portion Ed and also form the flexible portion Fu in the upper-side end portion Eu. In this case, as illustrated in FIG. 16B, while the lower-side end portion Ed of the display unit 2K and the upper-side end portion Eu of the display unit 2L are bonded to each other, both the lower-side end portion Ed of the display unit 2K and the upper-side end portion Eu of the display unit 2L can be bent.

Figure 17B:
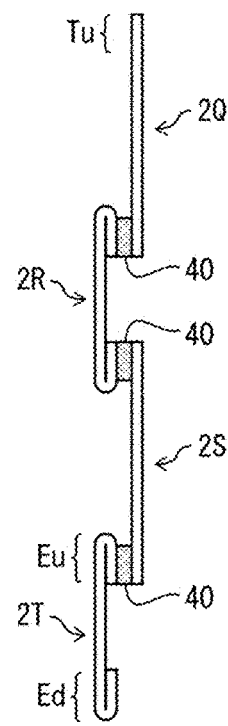

For example, as illustrated in FIG. 17A, it is allowable to provide two different types of display units: the display units 2Q and 2S of a first type where no flexible portion is formed in any of the upper-side end portion Eu and the lower-side end portion Ed; and the display units 2R and 2T of a second type where the flexible portions Fu and Fd are formed respectively in the upper-side end portion Eu and the lower-side end portion Ed. In this case, as illustrated in FIG. 17B, the display unit 2R where the flexible portions Fu and Fd are formed respectively in the two end portions Eu and Ed is bonded between the display units 2Q and 2S where no flexible portion is formed in any of the two end portions Eu and Ed. In addition, the display unit 2S where no flexible portion is formed any of the two end portions Eu and Ed is bonded between the display units 2R and 2T where the flexible portions Fu and Fd are formed respectively in the two end portions Eu and Ed.

In the case of bonding as illustrated in FIGS. 17A and 17B, a non-flexible display body may be used as each of the display units 2Q and 2S where no flexible portion is formed in any of the two end portions as long as no flexible portion if formed any of all the end portions. The use of a non-flexible display body as each of the display units where no flexible portion is used in any of the end portions helps improve the yield of the display device 1.

In addition, it is also allowable to couple three or more display units 2 in the Y-axis direction through any combination of various coupling ways such as ones illustrated in FIG. 1C, FIG. 15B, FIG. 16B, and FIG. 17B.

It is preferable to repeat only the coupling way illustrated in FIG. 11C, and bend only the lower-side end portions Ed. In this case, no display unit 2 has an upper-side end portion Eu with a flexible portion formed therein, but every display unit 2 has a lower-side end portion Ed with a flexible portion Fd formed therein. Accordingly, all the display unit 2 may have identical configurations. Alternatively, it is preferable to repeat only the coupling way illustrated in FIG. 15B and bend only the right-hand-side end portions Er. In this case, every display unit 2 has an upper-side end portion Ed with a flexible portion Fu formed therein, but no display unit 2 has a lower-side end portion Ed with a flexible portion formed therein. Accordingly, all the display unit 2 may have identical configurations.

Figure 18:
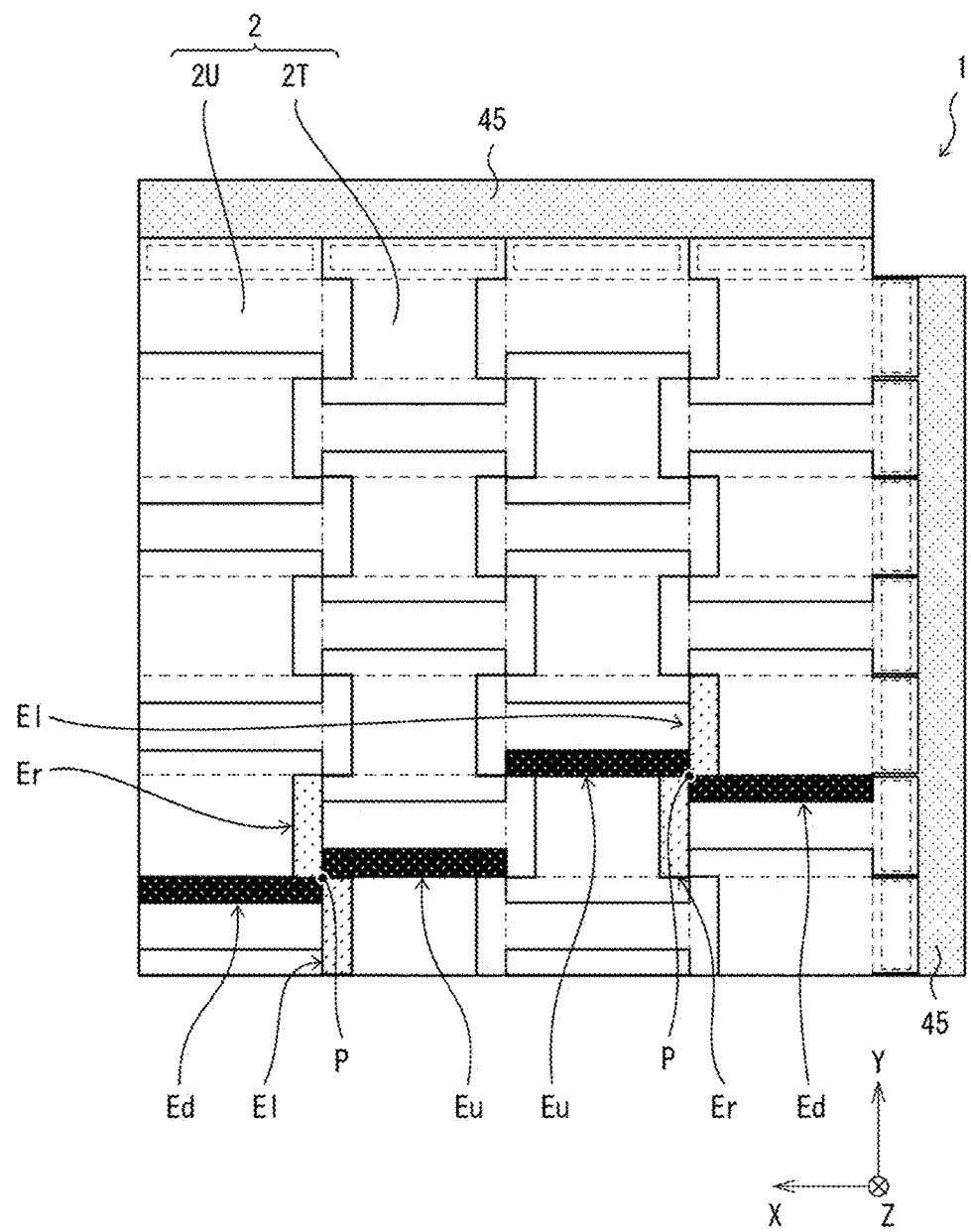
FIG. 18 is a plan view illustrating an exemplar combination of couplings, seen from the opposite side to the display surface, according to some embodiments of the disclosure.

It is preferable that the end portions El, Er, Eu, and Ed be bent as illustrated in FIG. 18 to allow no two mutually-bonded end portions around a certain meeting point P to overlap each other.

Figure 19A:
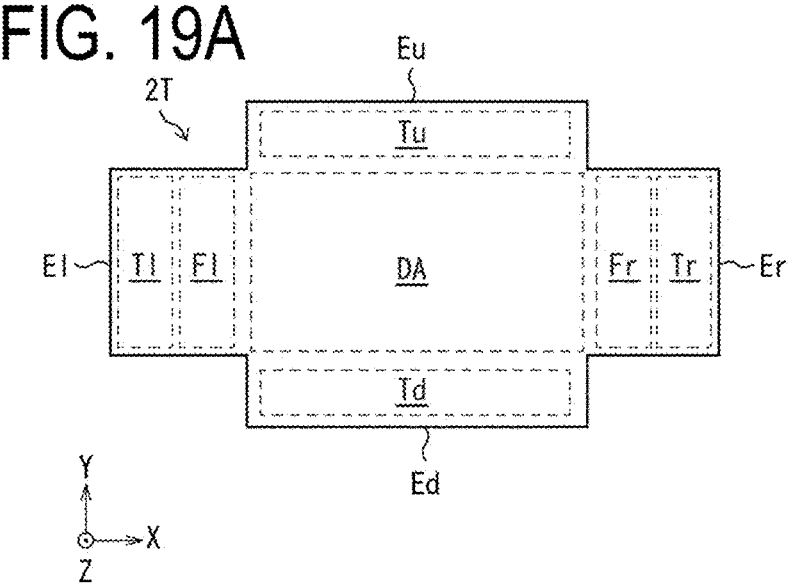
FIG. 19A is a plan view illustrating a general configuration of a first-type display unit illustrated as coupled in FIG. 18.
Figure 19B:
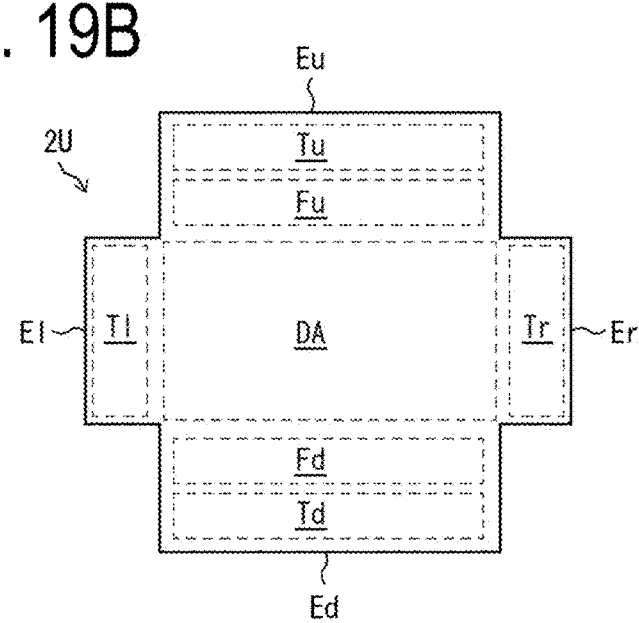
FIG. 19B is a plan view illustrating a general configuration of a second-type display unit illustrated as coupled in FIG. 18.

FIG. 18 is a plan view illustrating, viewed from the opposite side to the display surface, an exemplar combination of the coupling in the X-axis direction and the coupling in the Y-axis direction. FIG. 19A is a plan view illustrating a general configuration of a first-type display unit 2T illustrated as coupled in FIG. 18. FIG. 19B is a plan view illustrating a general configuration of a second-type display unit 2U illustrated as coupled in FIG. 18.

The plurality of display units 2 illustrated in FIG. 18 include two types of display units 2: a plurality of first-type display units 2T (first-type flexible display bodies) and a plurality of second-type display units 2U (second-type flexible display bodies). The first-type display unit 2T has a left-hand-side end portion El with a flexible portion Fl and a right-hand-side end portion Er with a flexible portion Fr. The first-type display unit 2T, however, has neither any upper-side end portion Eu with a flexible portion nor any lower-side end portion Ed with a flexible portion. The second-type display unit 2U has neither any left-hand-side end portion El with a flexible portion nor any right-hand-side end portion Er with a flexible portion. The second-type display unit 2U, however, has an upper-side end portion Eu with a flexible portion Fu and a lower-side end portion Ed with a flexible portion Fd.

The first-type display units 2T and the second-type display units 2U are coupled to one another, both in the X-axis direction and in the Y-axis direction. Hence, the left-hand-side end portion El of each first-type display unit 2T is bonded to the right-hand-side end portion Er of the corresponding second-type display unit 2U, and is bent. In addition, the right-hand-side end portion Er of each first-type display unit 2T is bonded to the left-hand-side end portion El of the corresponding different second-type display unit 2U, and is bent. In addition, the upper-side end portion Eu of each second-type display unit 2U is bonded to the lower-side end portion El of the corresponding first-type display unit 2T, and is bent. In addition, the lower-side end portion Ed of each second-type display unit 2U is bonded to the upper-side end portion Eu of the corresponding different first-type display unit 2T, and is bent. Such couplings can be accomplished by, for example a combination of the coupling in the X-axis direction as illustrated in FIGS. 9A and 9B, and the coupling in the Y-axis direction as illustrated in FIGS. 17A and 17B.

The above-described couplings cause the end portions El, Er, Eu, and Ed that meet at each meeting point P to fall down in the same rotational direction about each meeting point P (i.e., every end portion rotates clockwise or counterclockwise). In addition, the rotational direction in which the end portions El, Er, Eu, and Ed fall down about a particular meet point P is opposite to the rotational direction in which the corresponding end portions El, Er, Eu, and Ed fall down about a different meet point P that is adjacent to the particular meet point P (i.e., in a reversal rotational direction). Hence, each bonded end portion does not overlap a different bonded end portion. Accordingly, the bonded display unit 2 can have a reduced thickness and a reduced level difference between the display surfaces.

Supplement

A method for manufacturing a display device according to Aspect A1 of the disclosure is a method for manufacturing a display device including a plurality of flexible display bodies. Each of the flexible display bodies includes a plurality of first signal lines, and each of the first signal lines extends in a first direction extending from a first end portion to a second end portion. In addition, each of the flexible display bodies includes at least one of: (i) a plurality of first terminals disposed on a display surface of the first end portion and electrically connected to the corresponding first signal lines; and (ii) a plurality of second terminals disposed on a display surface of the second end portion and electrically connected to the corresponding first signal lines. The method includes: a first bonding step for bonding the second end portion of one of the flexible display bodies including the second terminals to the first end portion of a different one of the flexible display bodies including the first terminals by allowing (i) the display surfaces to face each other and (ii) each of the first terminals and the corresponding one of the second terminals to be electrically connected to each other; and a first bending step for bending towards an opposite side of the display surface, at least one of the first end portion and the second end portion that have been bonded to each other in the first bonding step.

The above-described method can reduce the gap (i.e., breaks of displayed images) between every two adjacent flexible display bodies.

A method for manufacturing a display device according to Aspect A2 of the disclosure may be Aspect A1, wherein the first bonding step includes a sub step where an anisotropic conductive film is bonded to a display surface of the first end portion or of the second end portion; and a sub step where the first end portion and the second end portion are bonded via the anisotropic conductive film.

The above-described method helps performing the first bonding step easily.

A method for manufacturing a display device according to Aspect A3 of the disclosure may be Aspect A1 or A2, wherein the first bending step is performed after the first bonding step.

The above-described method can improve the workability.

A method for manufacturing a display device according to Aspect A4 of the disclosure may be any one of Aspects A1 to A3, wherein all the flexible display bodies include their respective third terminals. In addition, the method further includes mounting a first circuit board, including a plurality of input/output terminals, on a display surface of the first end portion that has not been bonded to the second end portion in the first bonding step, and thus allowing each of the first terminals and the corresponding one of the input/output terminals to be electrically connected to each other (first circuit board mounting step).

The above-described method eliminates the driving circuit and the like that would otherwise be provided in the flexible display body. Hence, all the flexible display bodies can have identical configurations.

A method for manufacturing a display device according to Aspect A5 of the disclosure may be Aspect A4, wherein all the flexible display bodies include their respective second terminals. In addition, the method further includes any one of: a second circuit board mounting step for mounting a second circuit board, including a plurality of input/output terminals, on a display surface of the second end portion that has not been bonded to the first end portion in the first bonding step, and thus allowing each of the second terminals and the corresponding one of the input/output terminals to be electrically connected to each other; and a first cut-off step for cutting off the second end portion that has not been bonded to the first end portion in the first bonding step.

The above-described method allows the second end portion including the second terminal to be cut off if the second end portion is not necessary. Hence, all the flexible display bodies can have identical configurations.

A method for manufacturing a display device according to Aspect A6 of the disclosure may be any one of Aspects A1 to A5, wherein only any one of the first end portion and the second end portion is bent in the first bending step.

The above-described method allows the flexible portion to be formed only in any of the first end portion and the second end portion. Hence, all the flexible display bodies can have identical configurations.

A method for manufacturing a display device according to Aspect A7 of the disclosure may be any one of Aspects A1 to A5, wherein each of the flexible display bodies further includes a plurality of second signal lines, and each of the second signal lines extends in a second direction extending from a third end portion to a fourth end portion and crossing the first direction. In addition, each of the flexible display bodies further includes at least one of: (i) a plurality of third terminals disposed on a display surface of the third end portion and electrically connected to the corresponding second signal lines; and (ii) a plurality of fourth terminals disposed on a display surface of the fourth end portion and electrically connected to the corresponding second signal lines. The method includes: a second bonding step for bonding the fourth end portion of one of the flexible display bodies including the fourth terminals to the third end portion of a different one of the flexible display bodies including the third terminals by allowing (i) the display surfaces to face each other and (ii) each of the third terminals and the corresponding one of the fourth terminals to be electrically connected to each other; and a second bending step for bending, towards an opposite side of the display surface, at least one of the third end portion and the fourth end portion that have been bonded to each other in the second bonding step.

The above-described method can reduce the gap (i.e., breaks of displayed images) between every two adjacent flexible display bodies.

A method for manufacturing a display device according to Aspect A8 of the disclosure may be Aspect A7, wherein the second bonding step includes: a sub step where an anisotropic conductive film is bonded to a display surface of the third end portion or of the fourth end portion; and a sub step where the third end portion and the fourth end portion are bonded to each other via the anisotropic conductive film.

The above-described method can perform the second bonding step easily.

A method for manufacturing a display device according to Aspect A9 of the disclosure may be Aspect A7 or A8, wherein the second bending step is performed after the second bonding step.

The above-described method can improve the workability.

A method for manufacturing a display device according to Aspect A10 of the disclosure may be any one of Aspects A7 to A9, wherein all the flexible display bodies include their respective third terminals. In addition, the method further includes mounting a third circuit board, including a plurality of input/output terminals, on a display surface of the third end portion that has not been bonded to the fourth end portion in the second bonding step, and thus allowing each of the third terminals and the corresponding one of the input/output terminals to be electrically connected to each other (third circuit board mounting step).

The above-described method eliminates the driving circuit and the like that would otherwise be provided in the flexible display body. Hence, all the flexible display bodies can have identical configurations.

A method for manufacturing a display device according to Aspect A11 of the disclosure may be Aspect A10, wherein all the flexible display bodies include their respective second terminals. In addition, the method further includes any one of: a fourth circuit board mounting step for mounting a fourth circuit board, including a plurality of input/output terminals, on a display surface of the fourth end portion that has not been bonded to the third end portion in the second bonding step, and thus allowing each of the fourth terminals and the corresponding one of the input/output terminals to be electrically connected to each other; and a second cut-off step for cutting off the fourth end portion that has not been bonded to the third end portion in the second bonding step.

The above-described method allows the fourth end portion including the fourth terminal to be cut off if the fourth end portion is not necessary. Hence, all the flexible display bodies can have identical configurations.

A method for manufacturing a display device according to Aspect A12 of the disclosure may be any one of Aspects A7 to A11, wherein the flexible display body has a rectangular shape with its corners cut away to allow the first end portion and the second end portion to be separated from the third end portion and the fourth end portion.

The above-described method can reduce the thickness of the display units 2 coupled together at and near each meeting point.

A method for manufacturing a display device according to Aspect A13 of the disclosure may be any one of Aspects A7 to A12, wherein only any one of the first end portion and the second end portion is bent in the first bending step, whereas only any one of the third end portion and the fourth end portion is bent in the second bending step.

The above-described method allows the flexible portion to be formed only in any of the first end portion and the second end portion and also allows the flexible portion to be formed only in any of the third end portion and the fourth end portion. Hence, all the flexible display bodies can have identical configurations.

A method for manufacturing a display device according to Aspect A14 of the disclosure may be Aspect A12, wherein the flexible display body includes a plurality of first-type flexible display bodies and a plurality of second-type flexible display bodies. In addition, in the first bonding step, the first end portions of the first-type flexible display bodies are bonded to the second end portions of the second-type flexible display bodies, and the first end portions of the second-type flexible display bodies are bonded to the second end portions of the first-type flexible display bodies. In addition, in the first bending step, the first end portions and the second end portions of the first-type flexible display bodies are bent. Moreover, in the second bonding step, the third end portions of the first-type flexible display bodies are bonded to the fourth end portions of the second-type flexible display bodies, and the third end portions of the second-type flexible display bodies are bonded to the fourth end portions of the first-type flexible display bodies. Furthermore, in the second bending step, the third end portions and the fourth end portions of the second-type flexible display bodies are bent.

The above-described method allows the end portions coupled together around each meeting point can be bent to allow no two mutually-bonded end portions to overlap each other.

A method for manufacturing a display device according to Aspect A15 of the disclosure may be any one of Aspects A7 to A14, wherein the first signal line is any one of a gate wiring line and a source wiring line, and the second signal line is a different one of the gate wiring line and the source wiring line.

A display device according to Aspect A16 of the disclosure is a display device including a plurality of flexible display bodies. Each of the flexible display bodies includes a plurality of first signal lines, and each of the first signal lines extends in a first direction extending from a first end portion to a second end portion. In addition, each of the flexible display bodies includes at least one of: (i) a plurality of first terminals disposed on a display surface of the first end portion and electrically connected to the corresponding first signal lines; and (ii) a plurality of second terminals disposed on a display surface of the second end portion and electrically connected to the corresponding first signal lines. Moreover, the second end portion of one of the flexible display bodies including the second terminals is bonded to the first end portion of a different one of the flexible display bodies including the first terminals by allowing (i) the display surfaces to face each other and (ii) each of the first terminals and the corresponding one of the second terminals to be electrically connected to each other. Furthermore, at least one of the first end portion and the second end portion that have been bonded to each other is bent towards an opposite side of the display surface.

The above-described configuration can reduce the gap (i.e., breaks of displayed images) between every two adjacent flexible display bodies.

A display device according to Aspect A17 of the disclosure may be Aspect 16, wherein each of the flexible display bodies includes a plurality of second signal lines, and each of the second signal lines extends in a second direction extending from a third end portion to a fourth end portion. In addition, each of the flexible display bodies includes at least one of: (i) a plurality of third terminals disposed on a display surface of the third end portion and electrically connected to the corresponding second signal lines; and (ii) a plurality of fourth terminals disposed on a display surface of the fourth end portion and electrically connected to the corresponding second signal lines. Moreover, the fourth end portion of one of the flexible display bodies including the fourth terminals is bonded to the third end portion of a different one of the flexible display bodies including the third terminals by allowing (i) the display surfaces to face each other and (ii) each of the third terminals and the corresponding one of the fourth terminals to be electrically connected to each other. Furthermore, at least one of the third end portion and the fourth end portion that have been bonded to each other is bent towards an opposite side of the display surface.

The above-described configuration can reduce the gap (i.e., breaks of displayed images) between every two adjacent flexible display bodies.

A display device according to Aspect B1 of the disclosure is a display device including a plurality of display bodies coupled to one another, each of the display bodies including a display region having a display surface oriented in a first direction. In the display device, each of the display bodies includes the display region and a frame region surrounding the display region, and the display bodies include a first display body and a second display body. In addition, (i) the frame region of the first display body includes a first terminal portion including a plurality of first terminals formed therein, each of the first terminals having a terminal surface flush with the display surface, and (ii) in the frame region of the first display body, the terminal surface of the first terminal portion is bent towards a second direction, which is opposite the first direction. Moreover, the frame region of the second display body includes a second terminal portion including a plurality of second terminals formed therein, each of the second terminals having a terminal surface flush with the display surface. Furthermore, the first terminal portion of the first display body is bonded to the second terminal portion of the second display body to allow each of the first terminals to be electrically connected to the corresponding one of second terminals.

A display device according to Aspect B2 of the disclosure may be Aspect B1, wherein the first display body is a flexible display body, and the frame region of the first display body includes a bendable first flexible portion between the first terminal portion and the display region.

A display device according to Aspect B3 of the disclosure may be Aspect B1 or B2, wherein the display body further includes a third display body. In addition, the frame region of the second display body includes the first terminal portion on the opposite side of the display region to the second terminal portion. Moreover, a frame region of the third display body (i) includes the second terminal portion, and (ii) is bent to allow the terminal surface of the second terminal portion to be oriented in the second direction. Furthermore, the first terminal portion of the second display body is bonded to the second terminal portion of the third display body to allow each of the first terminals to be electrically connected to the corresponding one of the second terminals.

A display device according to Aspect B4 of the disclosure may be Aspect B3, wherein the third display body is a flexible display body, and the frame region of the third display body includes a bendable second flexible portion between the second terminal portion and the display region.

A display device according to Aspect B5 of the disclosure may be any one of Aspects B1 to B4, wherein the display body further includes a fourth display body. In addition, the frame region of the first display body (i) includes the second terminal portion located on an opposite side of the display region to the first terminal portion, and (ii) is bent to allow a terminal surface of the second terminal portion to be oriented in the second direction. Moreover, the frame region of the fourth display body includes the first terminal portion. Furthermore, the first terminal portion of the fourth display body is bonded to the second terminal portion of the first display body to allow each of the first terminals to be electrically connected to the corresponding one of the second terminals.

A display device according to Aspect B6 of the disclosure may be Aspect B5, wherein the first display body is a flexible display body, and the frame region of the first display body includes a bendable second flexible portion between the second terminal portion and the display region.

A display device according to Aspect B7 of the disclosure may be any one of Aspects B1 to B6, wherein the first display body is a rectangular-shaped flexible display body. In addition, the frame region of the first display body includes: the first terminal portion; the second terminal portion on an opposite side of the display region to the first terminal portion; a third terminal portion on a different side of the display region from the side where the first terminal portion and the second terminal portion are located, the third terminal portion including a plurality of third terminals with their respective terminal surfaces flush with the display surface; and a fourth terminal portion on an opposite side of the display region to the third terminal portion the fourth terminal portion including a plurality of fourth terminals with their respective terminal surfaces flush with the display surface. Moreover, the frame region of the first display body includes: a bendable first flexible portion between the first terminal portion and the display region; and a bendable third flexible portion between the third terminal portion and the display region.

A display device according to Aspect B8 of the disclosure may be any one of Aspects B1 to B7, wherein the display body further includes a fifth display body, and the frame region of the first display body is bent to allow the terminal surface of the third terminal portion to be oriented in the second direction. In addition, the fifth display body includes a frame region including the fourth terminal portion of the fifth display body. Moreover, the third terminal portion of the first display body is bonded to the fourth terminal portion to allow each of the third terminals to be electrically connected to the corresponding one of the fourth terminals.

A display device according to Aspect B9 of the disclosure may be Aspect B7, wherein the frame region of the first display body includes: a bendable second flexible portion between the second terminal portion and the display region; and a bendable fourth flexible portion between the fourth terminal portion and the display region.

A display device according to Aspect B10 of the disclosure may be Aspect B7 or B8, wherein the display body further includes the third display body, a sixth display body, and a seventh display body. In addition, the frame region of the second display body includes: the first terminal portion; the second terminal portion on an opposite side of the display region to the first terminal portion; a third terminal portion on a different side of the display region from the side where the first terminal portion and the second terminal portion are located, the third terminal portion including a plurality of third terminals with their respective terminal surfaces flush with the display surface; and a fourth terminal portion on an opposite side of the display region to the third terminal portion, the fourth terminal portion including a plurality of fourth terminals with their respective terminal surfaces flush with the display surface. In addition, a frame region of the third display body: (i) includes the second terminal portion; and (ii)is bent to allow the terminal surface of the second terminal portion to be oriented towards the second direction. In addition, a frame region of the sixth display body: (i) includes the fourth terminal portion, and (ii) is bent to allow a terminal surface of the fourth terminal portion to be oriented in the second direction. In addition, a frame region of the seventh display body (i) includes the third terminal portion, and (ii) is bent to allow a terminal surface of the third terminal portion to be oriented in the second direction. In addition, the first terminal portion of the second display body is bonded to the second terminal portion of the third display body to allow each of the first terminals to be electrically connected to the corresponding one of the second terminals. Moreover, the third terminal portion of the second display body is bonded to the fourth terminal portion of the sixth display body to allow each of the third terminals to be electrically connected to the corresponding one of the fourth terminals. Furthermore, the fourth terminal portion of the second display body is bonded to the third terminal portion of the seventh display body to allow each of the fourth terminals to be electrically connected to the corresponding one of the third terminals.

A display device according to Aspect B11 of the disclosure may be any one of Aspects B7 to B10, wherein the rectangular shape is a rectangular shape with its corner portions cut away to allow the first terminal portion, the second terminal portion, the third terminal portion, and the fourth terminal portion of the frame region to be separated from one another.

A display device according to Aspect B12 of the disclosure may be Aspect B1 or B2, wherein the display body further includes a fifth display body and a sixth display body. In addition, the first display body, the second display body, the fifth display body, and the sixth display body are rectangular-shaped flexible display bodies. In addition, each of the frame regions of the first display body, the second display body, the fifth display body, and the sixth display body includes: the first terminal portion; the second terminal portion on an opposite side of the display region to the first terminal portion; a third terminal portion on a different side of the display region from the side where the first terminal portion and the second terminal portion are located, the third terminal portion including a plurality of third terminals; and a fourth terminal portion on an opposite side of the display region to the third terminal portion, the fourth terminal portion including a plurality of fourth terminals. In addition, the rectangular shape is a rectangular shape with its corner portions cut away to allow the first terminal portion, the second terminal portion, the third terminal portion, and the fourth terminal portion of the frame region to be separated from one another. In addition, the frame region of the second display body is bent to allow a terminal surface of the third terminal portion to be oriented in the second direction. In addition, the frame region of the fifth display body is bent to allow a terminal surface of the fourth terminal portion to be oriented in the second direction. In addition, the frame region of the sixth display body is bent to allow a terminal surface of the second terminal portion to be oriented in the second direction. In addition, the third terminal portion of the first display body is bonded to the fourth terminal portion of the fifth display body to allow each of the third terminals to be electrically connected to the corresponding one of the fourth terminals. Moreover, the third terminal portion of the second display body is bonded to the fourth terminal portion of the sixth display body to allow each of the third terminals to be electrically connected to the corresponding one of the fourth terminals. Furthermore, the first terminal portion of the fifth display body is bonded to the second terminal portion of the sixth display body to allow each of the first terminals to be electrically connected to the corresponding one of the second terminals.

A display device according to Aspect B13 of the disclosure may be Aspect B12, wherein the first display body and the sixth display body are first-type flexible display bodies, and the second display body and the fifth display body are second-type flexible display bodies. In addition, a frame region of the first-type flexible display body includes: (i) a bendable first flexible portion between the first terminal portion and the display region; and (ii) a bendable second flexible portion between the second terminal portion and the display region. Moreover, a frame region of the second-type flexible display body includes: (i) a bendable third flexible portion between the third terminal portion and the display region; and (ii) a bendable fourth flexible portion between the fourth terminal portion and the display region.

A display device according to Aspect B14 of the disclosure may be any one of Aspects B1 to B13, wherein the mutually-bonded terminal portions are bonded via an anisotropic conductive film.

A display device according to Aspect B15 of the disclosure may be any one of Aspects B1 to B14, wherein a circuit board including a plurality of input/output terminals is mounted on a terminal portion of the outermost one of the display bodies to allow the input/output terminals of the circuit board to be electrically connected to the corresponding terminals of the terminal portion.

A display device according to Aspect B16 of the disclosure may be any one of Aspects B1 to B15, wherein the mutually-bonded terminal portions allow gate signal lines or source signal lines of the first display body and the second display body to be electrically connected to each other.

A display device according to Aspect B17 of the disclosure may be any one of Aspects B1 to B16, wherein each of the display bodies includes: a gate driving circuit configured to supply a signal to a plurality of gate signal lines included in that one of the display bodies; and a plurality of wiring lines configured to supply a signal to each of gate driving circuits. In addition, the mutually-bonded terminal portions allow a plurality of the wiring lines configured to supply a signal to each of the gate driving circuits of the first display body and the second display body to be electrically connected to each other, or allow the source signal lines of the first display body and of the second display body to be electrically connected to each other.

A display device according to Aspect B18 of the disclosure may be any one of Aspects B1 to B17, wherein the display bodies include a display body having the frame region not bent, and the display body having the frame region not bent is a non-flexible display body.

A method for manufacturing a display device according to Aspect B19 of the disclosure is a method including: coupling a plurality of display bodies to each other to allow a display surface of a display region to be oriented towards a first direction. Each of the display bodies includes the display region and a frame region surrounding the display region. Each of the display bodies includes a first display body and a second display body. The frame region of the first display body includes a first terminal portion where a plurality of first terminals have their respective terminal surfaces flush with the display surface. The frame region of the second display body includes a second terminal portion where a plurality of second terminals have their respective terminal surfaces flush with the display surface. In the method, the coupling includes: a first bending step for bending a frame region of the first display body to allow a terminal surface of the first terminal portion to be oriented towards a second direction, the opposite direction to the first direction; and a first bonding step for bonding the first terminal portion of the first display body to the second terminal portion of the second display body to allow each of the first terminals to be electrically connected to the corresponding one of the second terminals.

A method for manufacturing a display device according to Aspect B20 of the disclosure may be Aspect 19 wherein the first bending step is performed after the first bonding step.

A method for manufacturing a display device according to Aspect B21 of the disclosure may be the aspect 19 or 20, wherein the frame region of each of the display bodies includes: the first terminal portion; the second terminal portion on an opposite side of the display region to the first terminal portion, a third terminal portion on a different side of the display region from the side where the first terminal portion and the second terminal portion are located, the third terminal portion including a plurality of third terminals with their respective terminal surfaces flush with the display surface, and a fourth terminal portion on an opposite side of the display region to the third terminal portion the fourth terminal portion including a plurality of fourth terminals with their respective terminal surfaces flush with the display surface, In addition, the coupling further includes: a second bending step for bending a frame region of the first display body to allow a terminal surface of the third terminal portion to be oriented in the second direction; and a second bonding step for bonding the third terminal portion of the first display body to the fourth terminal portion of the second display body to allow each of the third terminals to be electrically connected to the corresponding one of the fourth terminals.

A method for manufacturing a display device according to Aspect B22 of the disclosure may be Aspect 21 wherein the second bending step is performed after the second bonding step.

The disclosure is not limited to each of the embodiments stated above, and various modified examples may be implemented within a range not departing from the scope of the claims. Embodiments obtained by appropriately combining technical approaches stated in each of the different embodiments also fall within the scope of the technology of the disclosure. In addition, novel technical features may be formed by combining the technical approaches stated in each of the embodiments.

REFERENCE SIGNS LIST

1 Display device
2, 2A to 2S, 2T, and 2U Display unit (Display body and Flexible display body)
2T First-type display unit (First-type flexible display body)
2U Second-type display unit (Second-type flexible display body)
3 Inorganic barrier layer
4 TFT layer
5 Light emitting element layer
6 Sealing layer
8 Adhesive layer
9 Upper face film
10 Lower face film
12 Resin layer
15 Semiconductor layer
16 Gate insulating film
18, 20 Passivation film
21 Flattening film
22 Anode electrode
23c Bank
23k Organic insulating film
24 EL layer 25 Cathode electrode
26 First inorganic sealing film
27 Organic sealing film
28 Second inorganic sealing film
39 Functional film
40 Anisotropic conductive film
45 Electronic circuit board
50 Support body
DA Active region
El, Er, Eu, and Ed End portion (First end portion, Second end portion, Third end portion, and Fourth end portion)
Fl, Fr, Fu, and Fd Flexible portion (First flexible portion, Second flexible portion, Third flexible portion, an Fourth flexible portion)
LWl and LWr Relay wiring line
NA Non-active region (Frame region)
Tl, Tr, Tu, and Td Terminal portion (First terminal portion, Second terminal portion, Third terminal portion, and Fourth terminal portion)
TMl, TMr, TMu, and TMd Terminal (First terminal, Second terminal, Third terminal, and Fourth terminal)

The invention claimed is:

1. A display device comprising:
a plurality of display bodies coupled to one another, each of the display bodies including a display region having a display surface oriented in a first direction,
wherein each of the display bodies includes the display region and a frame region surrounding the display region,
the display bodies include a first display body and a second display body,
(i) the frame region of the first display body includes a first terminal portion including a plurality of first terminals formed therein, each of the first terminals having a terminal surface flush with the display surface, and (ii) in the frame region of the first display body, the terminal surface of the first terminal portion is bent towards a second direction, which is opposite the first direction,
the frame region of the second display body includes a second terminal portion including a plurality of second terminals formed therein, each of the second terminals having a terminal surface flush with the display surface,
the first terminal portion of the first display body is bonded to the second terminal portion of the second display body to allow each of the first terminals to be electrically connected to the corresponding one of the second terminals.

2. The display device according to claim 1,
wherein the first display body is a flexible display body, and
the frame region of the first display body includes a bendable first flexible portion between the first terminal portion and the display region.

3. The display device according to claim 1,
wherein the display body further includes a third display body,
the frame region of the second display body includes the first terminal portion on the opposite side of the display region to the second terminal portion,
a frame region of the third display body (i) includes the second terminal portion, and (ii) is bent to allow the terminal surface of the second terminal portion to be oriented in the second direction, and
the first terminal portion of the second display body is bonded to the second terminal portion of the third display body to allow each of the first terminals to be electrically connected to the corresponding one of the second terminals.

4. The display device according to claim 3,
wherein the third display body is a flexible display body, and
the frame region of the third display body includes a bendable second flexible portion between the second terminal portion and the display region.

5. The display device according to claims 1,
wherein the display body further includes a fourth display body,
the frame region of the first display body (i) includes the second terminal portion located on an opposite side of the display region to the first terminal portion, and (ii) is bent to allow a terminal surface of the second terminal portion to be oriented in the second direction,
the frame region of the fourth display body includes the first terminal portion,
the first terminal portion of the fourth display body is bonded to the second terminal portion of the first display body to allow each of the first terminals to be electrically connected to the corresponding one of the second terminals.

6. The display device according to claim 5,
wherein the first display body is a flexible display body, and
the frame region of the first display body includes a bendable second flexible portion between the second terminal portion and the display region.

7. The display device according to claims 1,
wherein the first display body is a rectangular-shaped flexible display body,
the frame region of the first display body includes
the first terminal portion,
the second terminal portion on an opposite side of the display region to the first terminal portion,
a third terminal portion on a different side of the display region from the side where the first terminal portion and the second terminal portion are located, the third terminal portion including a plurality of third terminals with their respective terminal surfaces flush with the display surface, and
a fourth terminal portion on an opposite side of the display region to the third terminal portion the fourth terminal portion including a plurality of fourth terminals with their respective terminal surfaces flush with the display surface, and
the frame region of the first display body includes
a bendable first flexible portion between the first terminal portion and the display region, and
a bendable third flexible portion between the third terminal portion and the display region.

8. The display device according to claims 1,
wherein the display body further includes a fifth display body,
the frame region of the first display body is bent to allow the terminal surface of the third terminal portion to be oriented in the second direction,
the fifth display body includes a frame region including the fourth terminal portion of the fifth display body, and
the third terminal portion of the first display body is bonded to the fourth terminal portion to allow each of the third terminals to be electrically connected to the corresponding one of the fourth terminals.

9. The display device according to claim 7,
wherein the frame region of the first display body includes
a bendable second flexible portion between the second terminal portion and the display region, and
a bendable fourth flexible portion between the fourth terminal portion and the display region.

10. The display device according to claim 7,
wherein the display body further includes the third display body, a sixth display body, and a seventh display body,
the frame region of the second display body includes
the first terminal portion,
the second terminal portion on an opposite side of the display region to the first terminal portion,
a third terminal portion on a different side of the display region from the side where the first terminal portion and the second terminal portion are located, the third terminal portion including a plurality of third terminals with their respective terminal surfaces flush with the display surface, and
a fourth terminal portion on an opposite side of the display region to the third terminal portion, the fourth terminal portion including a plurality of fourth terminals with their respective terminal surfaces flush with the display surface, and
a frame region of the third display body (i) includes the second terminal portion; and (ii) is bent to allow the terminal surface of the second terminal portion to be oriented towards the second direction,
a frame region of the sixth display body (i) includes the fourth terminal portion, and (ii) is bent to allow a terminal surface of the fourth terminal portion to be oriented in the second direction,
a frame region of the seventh display body (i) includes the third terminal portion, and (ii) is bent to allow a terminal surface of the third terminal portion to be oriented in the second direction,
the first terminal portion of the second display body is bonded to the second terminal portion of the third display body to allow each of the first terminals to be electrically connected to the corresponding one of the second terminals,
the third terminal portion of the second display body is bonded to the fourth terminal portion of the sixth display body to allow each of the third terminals to be electrically connected to the corresponding one of the fourth terminals, and
the fourth terminal portion of the second display body is bonded to the third terminal portion of the seventh display body to allow each of the fourth terminals to be electrically connected to the corresponding one of the third terminals.

11. The display device according to claims 7,
wherein the rectangular shape is a rectangular shape with its corner portions cut away to allow the first terminal portion, the second terminal portion, the third terminal portion, and the fourth terminal portion of the frame region to be separated from one another.

12. The display device according to claim 1,
wherein the display body further includes a fifth display body and a sixth display body,
the first display body, the second display body, the fifth display body, and the sixth display body are rectangular-shaped flexible display bodies,
each of the frame regions of the first display body, the second display body, the fifth display body, and the sixth display body includes:
the first terminal portion,
the second terminal portion on an opposite side of the display region to the first terminal portion,
a third terminal portion on a different side of the display region from the side where the first terminal portion and the second terminal portion are located, the third terminal portion including a plurality of third terminals, and
a fourth terminal portion on an opposite side of the display region to the third terminal portion, the fourth terminal portion including a plurality of fourth terminals,
the rectangular shape is a rectangular shape with its corner portions cut away to allow the first terminal portion, the second terminal portion, the third terminal portion, and the fourth terminal portion of the frame region to be separated from one another,
the frame region of the second display body is bent to allow a terminal surface of the third terminal portion to be oriented in the second direction,
the frame region of the fifth display body is bent to allow a terminal surface of the fourth terminal portion to be oriented in the second direction,
the frame region of the sixth display body is bent to allow a terminal surface of the second terminal portion to be oriented in the second direction,
the third terminal portion of the first display body is bonded to the fourth terminal portion of the fifth display body to allow each of the third terminals to be electrically connected to the corresponding one of the fourth terminals,
the third terminal portion of the second display body is bonded to the fourth terminal portion of the sixth display body to allow each of the third terminals to be electrically connected to the corresponding one of the fourth terminals, and
the first terminal portion of the fifth display body is bonded to the second terminal portion of the sixth display body to allow each of the first terminals to be electrically connected to the corresponding one of the second terminals.

13. The display device according to claim 12,
wherein the first display body and the sixth display body are first-type flexible display bodies,
the second display body and the fifth display body are second-type flexible display bodies,
a frame region of the first-type flexible display body includes (i) a bendable first flexible portion between the first terminal portion and the display region; and
(ii) a bendable second flexible portion between the second terminal portion and the display region, and
a frame region of the second-type flexible display body includes (i) a bendable third flexible portion between the third terminal portion and the display region, and
(ii) a bendable fourth flexible portion between the fourth terminal portion and the display region.

14. The display device according to claims 1,
wherein the mutually-bonded terminal portions are bonded to each other via an anisotropic conductive film.

15. The display device according to claims 1,
wherein a circuit board including a plurality of input/output terminals is mounted on a terminal portion of the outermost one of the display bodies to allow the input/output terminals of the circuit board to be electrically connected to the corresponding terminals of the terminal portion.

16. The display device according to claims 1,
wherein the mutually-bonded terminal portions allow gate signal lines or source signal lines of the first display body and the second display body to be electrically connected to each other.

17. The display device according to claims 1,
wherein each of the display bodies includes a gate driving circuit configured to supply a signal to a plurality of gate signal lines included in that one of the display bodies, and a plurality of wiring lines configured to supply a signal to each of gate driving circuits, and
the mutually-bonded terminal portions allow a plurality of the wiring lines configured to supply a signal to each of the gate driving circuits of the first display body and the second display body to be electrically connected to each other, or allow the source signal lines of the first display body and of the second display body to be electrically connected to each other.

18. The display device according to claims 1,
wherein the display bodies include a display body having the frame region not bent, and
the display body having the frame region not bent is a non-flexible display body.

19. A method for manufacturing a display device comprising:
coupling a plurality of display bodies to each other to allow a display surface of a display region to be oriented towards a first direction,
each of the display bodies including the display region and a frame region surrounding the display region,
each of the display bodies including a first display body and a second display body,
the frame region of the first display body including a first terminal portion where a plurality of first terminals have their respective terminal surfaces flush with the display surface, and
the frame region of the second display body including a second terminal portion where a plurality of second terminals have their respective terminal surfaces flush with the display surface,
wherein the coupling includes
a first bending step for bending a frame region of the first display body to allow a terminal surface of the first terminal portion to be oriented towards a second direction, the opposite direction to the first direction, and
a first bonding step for bonding the first terminal portion of the first display body to the second terminal portion of the second display body to allow each of the first terminals to be electrically connected to the corresponding one of the second terminals.

20. The method for manufacturing a display device according to claim 19,
wherein the first bending step is performed after the first bonding step.

* * * * *